(12) United States Patent
Murata et al.

(10) Patent No.: US 8,652,746 B2
(45) Date of Patent: Feb. 18, 2014

(54) MANUFACTURING METHOD FOR POLYESTER PARTICLE DISPERSION LIQUID

(75) Inventors: Shoichi Murata, Wakayama (JP);
Hiroshi Mizuhata, Wakayama (JP);
Nobumichi Kamiyoshi, Wakayama (JP);
Eiji Shirai, Wakayama (JP)

(73) Assignee: Kao Corporation, Tokyo (JP)

( * ) Notice: Subject to any disclaimer, the term of this patent is extended or adjusted under 35 U.S.C. 154(b) by 132 days.

(21) Appl. No.: 13/061,912

(22) PCT Filed: Sep. 7, 2009

(86) PCT No.: PCT/JP2009/065584
§ 371 (c)(1),
(2), (4) Date: Mar. 2, 2011

(87) PCT Pub. No.: WO2010/027071
PCT Pub. Date: Mar. 11, 2010

(65) Prior Publication Data
US 2011/0177445 A1   Jul. 21, 2011

(30) Foreign Application Priority Data
Sep. 8, 2008 (JP) .................................. 2008-230319

(51) Int. Cl.
*G03G 5/00* (2006.01)

(52) U.S. Cl.
USPC .................................. 430/137.14; 430/109.4

(58) Field of Classification Search
USPC ............................. 430/108.4, 109.4, 137.14
See application file for complete search history.

(56) References Cited

U.S. PATENT DOCUMENTS

| | | | |
|---|---|---|---|
| 7,488,562 B2 | 2/2009 | Daimon et al. | |
| 7,745,085 B2 | 6/2010 | Ishiyama et al. | |
| 2005/0227160 A1* | 10/2005 | Shirai et al. | 430/109.4 |
| 2005/0271965 A1 | 12/2005 | Kamiyoshi et al. | |
| 2006/0115759 A1* | 6/2006 | Kim et al. | 430/109.4 |
| 2006/0216627 A1* | 9/2006 | Mizutani et al. | 430/109.4 |
| 2006/0292477 A1 | 12/2006 | Daimon et al. | |
| 2007/0141503 A1* | 6/2007 | Matsuoka et al. | 430/114 |
| 2008/0025754 A1* | 1/2008 | Ishiyama et al. | 399/106 |
| 2008/0131802 A1* | 6/2008 | Mizutani et al. | 430/109.4 |
| 2008/0187854 A1* | 8/2008 | Yoshida et al. | 430/109.4 |
| 2010/0055595 A1 | 3/2010 | Shirai et al. | |

FOREIGN PATENT DOCUMENTS

| | | |
|---|---|---|
| CN | 101114136 A | 1/2008 |
| CN | 101196704 A | 6/2008 |
| JP | 2002 72557 | 3/2002 |
| JP | 2002 351139 | 12/2002 |
| JP | 2004 198598 | 7/2004 |
| JP | 2006 18227 | 1/2006 |
| JP | 2006 195260 | 7/2006 |
| JP | 2007 4080 | 1/2007 |
| JP | 2007 322953 | 12/2007 |
| JP | 2008 33057 | 2/2008 |
| JP | 2008 139647 | 6/2008 |

OTHER PUBLICATIONS

International Search Report Issued Dec. 15, 2009 in PCT/JP09/065584 filed Sep. 7, 2009.
Chinese Office Action issued on May 15, 2012, in patent Application No. 200980135014.1 with English Translation.
Office Action issued Dec. 4, 2012 in Chinese Application No. 200980135014.1 (With English Translation).

* cited by examiner

*Primary Examiner* — Stewart Fraser
(74) *Attorney, Agent, or Firm* — Oblon, Spivak, McClelland, Maier & Neustadt, L.L.P.

(57) ABSTRACT

The present invention relates to a process for producing a dispersion of polyester particles which includes the step of emulsifying mixed polyester containing (1) an amorphous polyester containing a constitutional unit derived from a trivalent or higher-valent carboxylic acid in an amount of from 2.0 to 12.0 mol % on the basis of whole constitutional units of the whole amorphous polyester and (2) a crystalline polyester, in an aqueous medium in a single vessel, or the step of mixing the mixed polyester with an organic solvent and then adding the aqueous medium to the resulting mixture to emulsify the mixed polyester in a single vessel. The present invention also relates to a dispersion of polyester particles produced by the above production process, as well as a toner for electrophotography which is produced by subjecting the dispersion of the polyester particles to aggregation and coalescence and is excellent in both of a low-temperature fusing property and an anti-hot offset property, and a process for producing the toner.

19 Claims, No Drawings

MANUFACTURING METHOD FOR POLYESTER PARTICLE DISPERSION LIQUID

FIELD OF THE INVENTION

The present invention relates to a process for producing a dispersion of polyester particles, and a dispersion of polyester particles, as well as a toner for electrophotography which is obtained from the dispersion of polyester particles and a process for producing the toner.

BACKGROUND OF THE INVENTION

In the field of toners for electrophotography, with the progress of electrophotographic systems, it has been demanded to develop toners adaptable for high image quality and high printing speed. Further, it has been required that the toners are in the form of finely divided particles and have various properties such as a low-temperature fusing property and an anti-hot offset property.

To meet the above requirements, from the viewpoint of enhancing a low-temperature fusing property of the toners, various methods have been conventionally developed. For example, there are disclosed a process for producing a toner by using a crystalline polyester as a raw material which includes a neutralization step, an emulsifying step, an aggregating step and a coalescing step (refer to Patent Document 1), a process for producing a toner which includes a step of aggregating resin particles having a core/shell structure in which a difference in glass transition temperature between a resin forming the core and a resin forming the shell is 20° C. or more (refer to Patent Document 2), a process for producing a toner in which after adding a neutralizing agent and an aqueous medium to an organic solvent solution of a crystalline polyester and an amorphous polyester, an alkaline substance is added to the resulting solution to form O/W-type emulsified resin particles, and then the organic solvent is removed from the resulting emulsion to aggregate and coalesce the resin particles (refer to Patent Document 3), a process for producing a toner having a weight-average molecular weight distribution with two or more peaks, which includes a step of forming aggregated particles in a dispersion containing a crystalline resin and an amorphous resin (refer to Patent Document 4), and the like.

Patent Document 1: JP-A 2006-18227
Patent Document 2: JP-A 2007-322953
Patent Document 3: JP-A 2008-33057
Patent Document 4: JP-A 2007-4080

SUMMARY OF THE INVENTION

In the embodiments described in Patent Documents 1 and 3, a resin dispersion containing a crystalline polyester and an amorphous polyester is used. However, since an acid component constituting the amorphous polyester includes a divalent acid only, the resulting toner tends to be insufficient in anti-hot offset property. In the paragraph [0123] of Patent Document 2, there is disclosed a dispersion of polyester particles composed of one polyester obtained by using a small amount of trimellitic anhydride and another polyester obtained by using no trimellitic anhydride. However, the resulting toner tends to be insufficient in anti-hot offset property. On the other hand, in the production process described in Patent Document 4, the resin particles are well emulsified by using a large amount of ethyl acetate even when the amount of trimellitic anhydride used as a raw material component of the amorphous polyester increases. However, in the production process, a dispersion of crystalline polyester particles and a dispersion of amorphous polyester particles which are previously prepared separately from each other are mixed and then emulsified similarly to ordinary methods. Therefore, a mixture of both the dispersions is not in the form of a homogeneous dispersion, so that the resulting toner fails to exhibit a sufficient low-temperature fusing property.

Under these circumstances, the present invention relates to a process for producing a dispersion of polyester particles in which the polyester particles containing a crystalline polyester and an amorphous polyester can be homogeneously dispersed in an emulsion without need of using a large amount of an organic solvent for emulsification thereof even when a trivalent or higher-valent carboxylic acid component as a raw material component of the amorphous polyester is used in a predetermined amount or larger; and a dispersion of polyester particles which is produced according to the above production process; as well as a toner which is produced at least by conducting a step of aggregating and coalescing the above dispersion of polyester particles, and is excellent in both of a low-temperature fusing property and an anti-hot offset property.

Thus, the present invention relates to the following aspects:

[1] A process for producing a dispersion of polyester particles, including the step of emulsifying mixed polyester containing (1) an amorphous polyester containing a constitutional unit derived from a trivalent or higher-valent carboxylic acid in an amount of from 2.0 to 12.0 mol % on the basis of whole constitutional units of the whole amorphous polyester and (2) a crystalline polyester, in an aqueous medium in a single vessel, or the step of mixing the mixed polyester with an organic solvent and then adding the aqueous medium to the resulting mixture to emulsify the mixed polyester in a single vessel.

[2] A dispersion of polyester particles obtained by the process as described in the above aspect [1].

[3] A toner for electrophotography which is obtained at least by aggregating and coalescing the polyester particles contained in the dispersion of the polyester particles as described in the above aspect [2].

[4] A process for producing a toner for electrophotography, including at least the step of aggregating the polyester particles contained in the dispersion of the polyester particles as described in the above aspect [2] to obtain a dispersion of aggregated particles (aggregating step), and the step of coalescing the aggregated particles contained in the dispersion of the aggregated particles obtained in the aggregating step (coalescing step).

EFFECT OF THE INVENTION

In accordance with the present invention, there are provided a process for producing a dispersion of polyester particles in which the polyester particles containing a crystalline polyester and an amorphous polyester can be homogeneously dispersed in an emulsion even when a trivalent or higher-valent carboxylic acid component as a raw material component of the amorphous polyester is used in a predetermined amount or larger; and a dispersion of polyester particles which is produced according to the above production process; as well as a toner which is produced by aggregating and coalescing the above dispersion of polyester particles and is excellent in both of a low-temperature fusing property (i.e., a low lowest fusing temperature) and an anti-hot offset property.

DETAILED DESCRIPTION OF THE INVENTION

[Process for Producing Dispersion of Polyester Particles]

The process for producing a toner for electrophotography according to the present invention includes the step of emulsifying mixed polyester containing (1) an amorphous polyester containing a constitutional unit derived from a trivalent or higher-valent carboxylic acid in an amount of from 2.0 to 12.0 mol % on the basis of whole constitutional units of the whole amorphous polyester and (2) a crystalline polyester, in an aqueous medium in a single vessel, or the step of mixing the mixed polyester with an organic solvent and then adding the aqueous medium to the resulting mixture to emulsify the mixed polyester in a single vessel.

<(1) Amorphous Polyester Containing a Constitutional Unit Derived From a Trivalent or Higher-Valent Carboxylic Acid in an Amount of From 2.0 to 12.0 Mol % on the Basis of Whole Constitutional Units of the Whole Amorphous Polyester>

The amorphous polyester used in the present invention contains a constitutional unit derived from a trivalent or higher-valent carboxylic acid in an amount of from 2.0 to 12.0 mol %, preferably from 3 to 11 mol %, more preferably from 3.5 to 10.6 mol % and still more preferably from 5 to 10.6 mol % on the basis of whole constitutional units of the whole amorphous polyester from the viewpoint of a good anti-hot offset property of the resulting toner. Meanwhile, the number of moles of the respective constitutional units is calculated as the number of moles of an alcohol component or an acid component used as raw materials of the polyester. In the constitutional units of the whole amorphous polyester contained in the resulting mixed polyester, the constitutional unit derived from a trivalent or higher-valent carboxylic acid is preferably contained in the same amount as described above.

In addition, the amorphous polyester having an acid group at a molecular end thereof is preferably used. Examples of the acid group include a carboxyl group, a sulfonic group, a phosphonic group and a sulfinic group. Among these acid groups, a carboxyl group is preferred from the viewpoint of fully emulsifying the mixed polyester.

The amorphous polyester may be produced, for example, by polycondensing an alcohol component and an acid component containing a trivalent or higher-valent carboxylic acid in an inert gas atmosphere at a temperature of preferably from 180 to 250° C., if required, by using a catalyst.

The amorphous polyester may be in the form of a mixture of two or more kinds of amorphous polyesters which are different in kinds and contents of monomers (such as an alcohol component and an acid component), softening point, molecular weight, etc., from each other. Further, the amorphous polyester may include therein an amorphous polyester which contains a constitutional unit derived from a trivalent or higher-valent carboxylic acid in an amount out of the above-specified range, or an amorphous polyester containing no constitutional unit derived from a trivalent or higher-valent carboxylic acid.

Even in the case where the amorphous polyester is in the form of such a mixture, the constitutional unit derived from a trivalent or higher-valent carboxylic acid may be contained in the mixture in an amount of from 2.0 to 12.0 mol % on the basis of whole constitutional units of the whole amorphous polyester included in the mixture. That is, the specific amorphous polyester used in the present invention may also be produced by previously mixing a polyester (a) obtained by polycondensing an acid component having a high content of the constitutional unit derived from a trivalent or higher-valent carboxylic acid and an alcohol component and a polyester (b) obtained by polycondensing an acid component having a low content of the constitutional unit derived from a trivalent or higher-valent carboxylic acid and an alcohol component while appropriately adjusting a mixing weight ratio therebetween.

As described above, in the present invention, the acid component of the amorphous polyester includes at least a trivalent or higher-valent carboxylic acid component. Examples of the trivalent or higher-valent carboxylic acid component include polycarboxylic acids such as trimellitic acid, 2,5,7-naphthalene-tricarboxylic acid and pyromellitic acid; and anhydrides and alkyl ($C_1$ to $C_3$) esters of these acids. Among these carboxylic acid components, from the viewpoints of enhancing a polycondensation reactivity and improving an anti-hot offset property of the resulting toner, preferred are trimellitic acid and trimellitic anhydride.

In addition, the acid component of the amorphous polyester may also contain acid components other than the trivalent or higher-valent carboxylic acid component. As the other acid components, there may be used known compounds such as a carboxylic acid, a carboxylic acid anhydride and a carboxylic acid ester.

Specific examples of the other acid components include divalent dicarboxylic acids such as phthalic acid, isophthalic acid, terephthalic acid, sebacic acid, fumaric acid, maleic acid, adipic acid, azelaic acid, succinic acid and cyclohexanedicarboxylic acid; succinic acids substituted with an alkyl group having 1 to 20 carbon atoms or an alkenyl group having 2 to 20 carbon atoms such as dodecylsuccinic acid, dodecenylsuccinic acid and octenylsuccinic acid; and anhydrides and alkyl ($C_1$ to $C_3$) esters of these acids. These other acid components may be used alone or in combination of any two or more thereof.

As the alcohol component of the amorphous polyester, there may be used aliphatic diols containing a main chain having 2 to 10 carbon atoms such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, neopentyl glycol and 1,4-butenediol; aromatic diols such as alkylene ($C_2$ to $C_3$) oxide adducts (average molar number of addition: 1 to 16) of bisphenol A such as typically polyoxypropylene-2,2-bis(4-hydroxyphenyl)propane and polyoxyethylene-2,2-bis(4-hydroxyphenynpropane; hydrogenated products of bisphenol A; and trivalent or higher-valent polyhydric alcohols such as glycerol and pentaerythritol. Among these alcohol components, from the viewpoint of facilitated production of the amorphous polyester, preferred are those alcohol components containing at least the alkyleneoxide adduct of bisphenol A. These alcohol components may be used alone or in combination of any two or more thereof.

The catalyst used upon subjecting the acid component and the alcohol component to polycondensation reaction is not particularly limited, and there may be used any known catalysts. Examples of the catalyst usable in the above polycondensation reaction include tin compounds such as dibutyl tin oxide and tin dioctylate; titanium compounds such as titanium diisopropylate bistriethanol aminate; and the like. Among these catalysts, preferred are the tin compounds and the titanium compounds. In addition, among the tin compounds, preferred are those tin compounds having no Sn—C bond such as tin dioctylate. The amount of the catalyst used is not particularly limited, and is preferably from 0.01 to 1 part by weight and more preferably from 0.01 to 0.6 part by weight on the basis of 100 parts by weight of a total amount of the alcohol component and the carboxylic acid component.

(Properties of Amorphous Polyester)

From the viewpoint of a good storage stability of the resultant toner, the amorphous polyester preferably has a softening point of from 70 to 165° C., more preferably from 70 to 140° C., still more preferably from 90 to 140° C. and further still more preferably from 100 to 130° C. Meanwhile, in the case where two kinds of amorphous polyesters which are different in softening point from each other are used from the viewpoints of a good low-temperature fusing property and a good durability of the resulting toner, one polyester (i) preferably has a softening point of not lower than 70° C. and lower than 150° C., and the other polyester (ii) preferably has a softening point of from 115 to 165° C. The weight ratio of the amorphous polyester (i) to the amorphous polyester (ii) (i/ii) is preferably from 1/9 to 9/1 and more preferably from 5/5 to 9/1.

The amorphous polyester preferably has a glass transition temperature of from 50 to 85° C., more preferably from 55 to 75° C. and still more preferably from 60 to 70° C.

The acid value of the amorphous polyester is preferably from 6 to 35 mg KOH/g, more preferably from 10 to 35 mg KOH/g and still more preferably from 15 to 35 mg KOH/g from the viewpoint of fully emulsifying the mixed polyester.

From the viewpoint of a good durability of the resultant toner, the number-average molecular weight of the amorphous polyester is preferably from 1,000 to 50,000, more preferably from 1,000 to 10,000 and still more preferably from 2,000 to 8,000.

The softening point, glass transition temperature, acid value and number-average molecular weight of the amorphous polyester may be desirably adjusted by controlling the temperature and time, etc., used in the polycondensation reaction. Meanwhile, when the amorphous polyester is in the form of a mixture of two or more kinds of amorphous polyesters, the softening point and glass transition temperature of the amorphous polyester mean the softening point and glass transition temperature of the mixture of the amorphous polyesters, respectively.

Meanwhile, the degree of crystallization of a polyester may be usually expressed by a crystallinity index defined by a ratio of a softening point to an endothermic highest peak temperature as measured by a differential scanning colorimeter (softening point/endothermic highest peak temperature). In general, when the crystallinity index value exceeds 1.4, the resin becomes amorphous, whereas when the crystallinity index value is less than 0.6, the resin exhibits a low crystallinity and contains a large amount of an amorphous portion.

The crystallinity index value of the amorphous polyester used in the present invention is preferably less than 0.6 or more than 1.4 but not more than 4, more preferably less than 0.6 or not less than 1.5 but not more than 4, still more preferably less than 0.6 or more than 1.5 but not more than 4, further still more preferably more than 1.5 but not more than 3, and especially preferably more than 1.5 but not more than 2 from the viewpoint of a good low-temperature fusing property and a good anti-hot offset property of the resulting toner. The degree of crystallization of the amorphous polyester may be desirably adjusted by appropriately controlling kinds of monomers used and ratios therebetween, as well as production conditions (such as, for example, reaction temperature, reaction time and cooling rate).

<(2) Crystalline Polyester>

The crystalline polyester used in the present invention is preferably a crystalline polyester having an acid group at a molecular end thereof. Examples of the acid group include a carboxyl group, a sulfonic group, a phosphonic group and a sulfinic group. Among these acid groups, a carboxyl group is preferred from the viewpoint of achieving both sufficient emulsification of the mixed polyester and a good environmental resistance of the resulting toner.

The crystalline polyester used in the present invention may be produced by an ordinary polycondensation reaction, namely, may be produced by subjecting a carboxylic acid component and an alcohol component as raw materials to dehydrative polycondensation in the presence of a catalyst preferably at a temperature of from 180 to 250° C.

Examples of the carboxylic acid component of the crystalline polyester include aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid and n-dodecenylsuccinic acid; alicyclic dicarboxylic acids such as cydohexanedicarboxylic acid; aromatic dicarboxylic acids such as phthalic acid, isophthalic acid and terephthalic acid; aromatic trivalent or higher-valent polycarboxylic acids such as trimellitic acid and pyromellitic acid; and anhydrides and alkyl ($C_1$ to $C_3$) esters of these acids. These carboxylic acid components may be used alone or in combination of any two or more thereof.

Also, from the viewpoints of a good tribocharge property and a good durability of the toner, as the carboxylic acid component of the crystalline polyester, there is preferably used an "aromatic carboxylic acid component" such as the above aromatic dicarboxylic acids, aromatic polycarboxylic acids and anhydride and alkyl ($C_1$ to $C_3$) esters of these acids. Among these aromatic carboxylic acid components, from the same viewpoints as described above, preferred are aromatic dicarboxylic acids and anhydrides or alkyl ($C_1$ to $C_3$) esters thereof (hereinafter occasionally referred to generally as an "aromatic dicarboxylic acid component"); more preferred are aromatic dicarboxylic acids; still more preferred are terephthalic acid and isophthalic acid; and most preferred is terephthalic acid.

From the viewpoints of a good tribocharge property and a good durability of the toner, the crystalline polyester preferably contains a constitutional unit derived from the above aromatic carboxylic acid component in an amount of from 50 to 100 mol %, more preferably from 80 to 100 mol % and still more preferably from 90 to 100 mol % on the basis of the whole carboxylic acid component constituting the crystalline polyester.

Examples of the alcohol component of the crystalline polyester include the same alcohol components as used for production of the amorphous polyester. Among the alcohol components, from the viewpoints of promoting crystallization of the polyester and enhancing a low-temperature fusing property of the toner, preferred are aliphatic diols having 2 to 10 carbon atoms, more preferred are aliphatic diols having 2 to 8 carbon atoms, and still more preferred are aliphatic diols having 4 to 6 carbon atoms. More specifically, among the above aliphatic diols, preferred are α,ω-straight-chain alkanediols, more preferred are 1,5-pentanediol, 1,6-hexanediol and 1,9-nonanediol, and still more preferred are 1,5-pentanediol and 1,6-hexanediol. These alcohol components may be used alone or in combination of any two or more thereof.

In order to promote crystallization of the polyester, the crystalline polyester is preferably produced by polycondensing an alcohol component containing an aliphatic diol having 2 to 10 carbon atoms in an amount of from 80 to 100 mol % (more preferably from 90 to 100 mol %) with a carboxylic acid component (preferably such a carboxylic acid component containing an aromatic carboxylic acid component in an amount of from 50 to 100 mol %).

In addition, from the viewpoints of a good tribocharge property and a good durability of the toner, the crystalline polyester is preferably produced by polycondensing an alcohol component containing an aliphatic diol having 2 to 10 carbon atoms in an amount of from 80 to 100 mol % (more preferably from 90 to 100 mol %) with a carboxylic acid component containing an aromatic dicarboxylic acid component in an amount of from 80 to 100 mol % (more preferably from 90 to 100 mol %).

The catalyst used upon subjecting the carboxylic acid component and the alcohol component to polycondensation reaction is not particularly limited, and there may be used any suitable known catalysts. Examples of the catalyst include the same catalysts as used for production of the amorphous polyester. The amount of the catalyst used is also not particularly limited, and is preferably from 0.01 to 1 part by weight and more preferably from 0.1 to 0.6 part by weight on the basis of 100 parts by weight of a total amount of the carboxylic acid component and the alcohol component.

Meanwhile, the above crystalline polyester may be used alone or in combination of any two or more thereof.

(Degree of Crystallization of Crystalline Polyester)

The crystallinity index of the crystalline polyester used in the present invention is preferably from 0.6 to 1.4. From the viewpoint of a good low-temperature fusing property of the toner, the crystallinity index of the crystalline polyester is more preferably from 0.8 to 1.3, still more preferably from 0.9 to 1.1 and further still more preferably from 0.98 to 1.05. The degree of crystallization of the crystalline polyester may be desirably adjusted by appropriately controlling kinds of monomers used and ratios therebetween, as well as production conditions (such as, for example, reaction temperature, reaction time and cooling rate).

(Properties of Crystalline Polyester)

From the viewpoint of a good low-temperature fusing property of the resultant toner, the crystalline polyester preferably has a softening point of from 70 to 130° C., more preferably from 75 to 120° C. and still more preferably from 80 to 110° C.

The melting point of the crystalline polyester is preferably from 60 to 150° C., more preferably from 60 to 130° C. and still more preferably from 60 to 120° C. from the viewpoint of a good low-temperature fusing property of the resultant toner.

The acid value of the crystalline polyester is not particularly limited, and is preferably from 1 to 50 mg KOH/g, more preferably from 2 to 40 mg KOH/g and still more preferably from 3 to 30 mg KOH/g from the viewpoints of stabilizing the polyester particles and obtaining a toner having a small particle size and a sharp particle size distribution.

From the viewpoint of sufficient emulsification of the mixed polyester and a good low-temperature fusing property of the resultant toner, the number-average molecular weight of the crystalline polyester is preferably from 1,500 to 50,000, more preferably from 1,500 to 10,000, still more preferably from 1,500 to 8,000 and further still more preferably from 2,500 to 5,500.

The softening point, melting point, acid value and number-average molecular weight of the crystalline polyester may be desirably adjusted by appropriately controlling the temperature and time, etc., used in the polycondensation reaction. Meanwhile, when the crystalline polyester is in the form of a mixture of two or more kinds of crystalline polyesters, the softening point and melting point of the crystalline polyester mean the softening point and melting point of the mixture of the crystalline polyesters, respectively.

Meanwhile, in the present invention, the amorphous polyester and/or the crystalline polyester may be modified to such an extent that these polyesters are substantially free from deterioration in inherent properties thereof. However, in the present invention, the unmodified polyesters are preferably used. Examples of the method of modifying the polyesters include the method of grafting and blocking polyesters with phenol, urethane, epoxy, etc., according to the methods described, for example, in JP-A 11-133668, JP-A 10-239903 and JP-A 8-20636, and the method of forming composite resins containing two or more kinds of resin units including a polyester unit.

<(3) Mixed Polyester>

In the present invention, as the mixed polyester, the amorphous polyester and the crystalline polyester are used in combination to enhance a low-temperature fusing property and an anti-hot offset property of the resulting toner. The weight ratio of the crystalline polyester to the amorphous polyester (crystalline polyester/amorphous polyester) in the mixed polyester is preferably from 1/9 to 5/5, more preferably from 2/8 to 5/5 and still more preferably from 2/8 to 4/6 from the viewpoints of a good low-temperature fusing property and a good anti-hot offset property of the resulting toner.

<(4) Emulsifying Step>

In the present invention, the mixed polyester containing the amorphous polyester containing a constitutional unit derived from a trivalent or higher-valent carboxylic acid component in an amount of from 2.0 to 12.0 mol % and the crystalline polyester is emulsified in an aqueous medium in a single vessel (hereinafter referred to as an "emulsifying step A"), or the mixed polyester is mixed with an organic solvent, and then the aqueous medium is added to the resulting mixture to emulsify the mixed polyester in a single vessel (hereinafter referred to as an "emulsifying step B"), thereby producing the dispersion of polyester particles.

(Emulsifying Step A)

The aqueous medium used for emulsifying the mixed polyester contains water such as deionized water and distilled water as a main component. From the viewpoint of a good environmental suitability, the content of water in the aqueous medium is preferably 80% by weight or larger, more preferably 90% by weight or larger, still more preferably 95% by weight or larger and especially preferably substantially 100% by weight.

Examples of components other than water which may be contained in the aqueous medium include water-soluble organic solvents, e.g., alkyl alcohols having 1 to 5 carbon atoms such as methanol, ethanol, isopropanol and butanol; dialkyl ($C_1$ to $C_3$) ketones such as acetone and methyl ethyl ketone; and cyclic ethers such as tetrahydrofuran. Among these water-soluble organic solvents, from the viewpoint of preventing inclusion of the solvent into the resulting toner, preferred are alkyl alcohols having 1 to 5 carbon atoms which are organic solvents incapable of dissolving the polyester therein, and more preferred are methanol, ethanol, isopropanol and butanol.

The polyester particles contained in the dispersion of polyester particles obtained by emulsifying the mixed polyester in the aqueous medium preferably contains a colorant. The polyester particles may also contain various optional additives such as a releasing agent, a charge controlling agent, a reinforcing filler such as fibrous materials, an antioxidant and an age resistor, if required.

The colorant to be contained in the polyester particles is not particularly limited, and may be appropriately selected from any known colorants according to the requirements. Specific examples of the colorant include various pigments such as carbon blacks, inorganic composite oxides, Chrome Yellow, Hansa Yellow, Benzidine Yellow, Threne Yellow, Permanent Red, Brilliant Carmine 3B, Brilliant Carmine 6B, Rhodamine B Lake, red iron oxide, Aniline Blue, ultramarine blue, Phthalocyanine Blue and Phthalocyanine Green; and various dyes such as acridine dyes, azo dyes, benzoquinone dyes, azine dyes, anthraquinone dyes, indigo dyes, phthalocyanine dyes and Aniline Black dyes. These colorants may be used alone or in combination of any two or more thereof.

The content of the colorant in the mixed polyester is preferably 20 parts by weight or less and more preferably from 0.01 to 10 parts by weight on the basis of 100 parts by weight of the mixed polyester.

Examples of the releasing agent include low-molecular weight polyolefins such as polyethylene, polypropylene and polybutene; silicones exhibiting a softening point upon heating; fatty acid amides such as oleamide and stearamide; vegetable waxes such as carnauba wax, rice wax and candelilla wax; animal waxes such as beeswax; mineral and petroleum waxes such as montan wax, paraffin wax and Fischer-Tropsch wax; and the like. These releasing agents may be used alone or in combination of any two or more thereof.

The releasing agent is preferably used in the form of a dispersion in an aqueous medium from the viewpoints of a good dispersibility and a good aggregating property with the polyester particles.

The content of the releasing agent in the mixed polyester is generally preferably from 1 to 20 parts by weight and more preferably from 2 to 15 parts by weight on the basis of 100 parts by weight of the mixed polyester (on the basis of 100 parts by weight of a sum of the mixed polyester and the colorant, if the colorant is used), in view of attaining good effects due to addition thereof and preventing adverse influence on a tribocharge property of the resulting toner.

Examples of the charge controlling agent include metal salts of benzoic acid, metal salts of salicylic acid, metal salts of alkylsalicylic acids, metal salts of catechol, metal (such as chromium, iron and aluminum)-containing bisazo dyes, tetraphenyl borate derivatives, quaternary ammonium salts and alkyl pyridinium salts.

The content of the charge controlling agent in the mixed polyester is generally preferably 10 parts by weight or less and more preferably from 0.01 to 5 parts by weight on the basis of 100 parts by weight of the mixed polyester.

In the present invention, the mixed polyester is preferably emulsified in the presence of a surfactant from the viewpoints of an enhanced emulsification stability of the mixed polyester, etc. The content of the surfactant in the mixed polyester is generally preferably 20 parts by weight or less, more preferably 15 parts by weight or less, still more preferably from 0.1 to 10 parts by weight and further still more preferably from 0.5 to 10 parts by weight on the basis of 100 parts by weight of the mixed polyester. The surfactants may be used alone or in combination of any two or more thereof.

Examples of the surfactant include anionic surfactants such as sulfate-based surfactants, sulfonate-based surfactants, phosphate-based surfactants and soap-based surfactants; cationic surfactants such as amine salt-type surfactants and quaternary ammonium salt-type surfactants; and nonionic surfactants such as polyethylene glycol-based surfactants, alkyl phenol ethyleneoxide adduct-based surfactants and polyhydric alcohol-based surfactants. As any of these surfactants, there may be used commercially available products. Among these surfactants, nonionic surfactants are preferably used. The nonionic surfactant is more preferably used in combination with the anionic surfactant or the cationic surfactant. From the viewpoint of fully emulsifying the mixed polyester used in the present invention which contains a constitutional unit derived from a trivalent or higher-valent carboxylic acid in a specific amount, the nonionic surfactant is more preferably used in combination with the anionic surfactant.

When using the nonionic surfactant in combination with the anionic surfactant, the weight ratio of the nonionic surfactant to the anionic surfactant (nonionic surfactant/anionic surfactant) is preferably from 0.3 to 10 and more preferably from 0.5 to 5 from the viewpoint of fully emulsifying the mixed polyester used in the present invention.

Specific examples of the anionic surfactant include dodecylbenzenesulfonic acid, sodium dodecylbenzenesulfonate, sodium dodecylsulfate, sodium alkylethersulfates, sodium alkylnaphthalenesulfonates and sodium dialkylsulfosuccinates. Among these anionic surfactants, preferred is sodium dodecylbenzenesulfonate.

Specific examples of the cationic surfactants include alkylbenzenedimethyl ammonium chlorides, alkyltrimethyl ammonium chlorides and distearyl ammonium chloride.

Examples of the nonionic surfactants include polyoxyethylene alkyl aryl ethers or polyoxyethylene alkyl ethers such as polyoxyethylene nonylphenyl ether, polyoxyethylene oleyl ether and polyoxyethylene lauryl ether; polyoxyethylene sorbitan esters such as polyoxyethylene sorbitan monolaurate and polyoxyethylene sorbitan monostearate; polyoxyethylene fatty acid esters such as polyethylene glycol monolaurate, polyethylene glycol monostearate and polyethylene glycol monooleate; and oxyethylene/oxypropylene block copolymers.

As the method of carrying out the emulsifying step A, there is preferably used the method in which an aqueous alkali solution is added, if required, together with the above additives, to the mixed polyester in a single vessel to emulsify the mixed polyester and the additives therein.

The aqueous alkali solution preferably has a concentration of from 1 to 30% by weight, more preferably from 1 to 25% by weight and still more preferably from 1.5 to 20% by weight. As the alkali used in the aqueous alkali solution, there is preferably used such an alkali which allows a salt of the alkali and the polyester to exhibit an enhanced self-dispersibility. Specific examples of the alkali include hydroxides of alkali metals such as potassium hydroxide and sodium hydroxide.

After dispersing the mixed polyester and the additives in the aqueous alkali solution, the resulting dispersion is neutralized at a temperature not lower than a glass transition temperature of the amorphous polyester, and then an aqueous medium is added to the dispersion at a temperature not lower than the glass transition temperature of the amorphous polyester to emulsify the mixed polyester therein, thereby producing the dispersion of polyester particles.

The velocity of addition of the aqueous medium is preferably from 0.1 to 50 parts by weight/min, more preferably from 0.1 to 30 parts by weight/min, still more preferably from 0.5 to 10 parts by weight/min and further still more preferably from 0.5 to 5 parts by weight/min on the basis of 100 parts by weight of the mixed polyester from the viewpoint of efficiently conducting the emulsifying step. The velocity of addition of the aqueous medium may be generally maintained until an O/W type emulsion is substantially formed. Therefore, the velocity of addition of the aqueous medium after forming the O/W type emulsion is not particularly limited.

The amount of the aqueous medium used is preferably from 100 to 2,000 parts by weight, more preferably from 150 to 1,500 parts by weight and still more preferably from 150 to 500 parts by weight on the basis of 100 parts by weight of the mixed polyester from the viewpoint of obtaining homogeneous aggregated particles in the subsequent aggregating step. The amount of the aqueous medium used may be determined such that the solid content of the resulting dispersion of polyester particles preferably lies within the range of from 7 to 50% by weight, more preferably from 10 to 40% by weight, still more preferably from 20 to 40% by weight and further still more preferably from 25 to 35% by weight from the viewpoints of a good stability and a good handling property of the resulting dispersion of polyester particles. Meanwhile, the solid components contained in the dispersion of polyester particles may include nonvolatile components such as the mixed polyester, the nonionic surfactant, etc.

From the viewpoint of preparing the dispersion containing fine polyester particles, the temperature used upon adding the aqueous medium is preferably not lower than the softening point of the crystalline polyester and not higher than the softening point of the amorphous polyester. When the emulsification is conducted in the above-specified temperature range, the mixed polyester can be smoothly emulsified in the aqueous medium, and any special heating apparatus is not required therefor.

(Emulsifying Step B)

In the emulsifying step B, the mixed polyester is mixed with an organic solvent, and then an aqueous medium is added to the resulting mixture to emulsify the mixed polyester.

The organic solvent to be mixed with the mixed polyester is not particularly limited, and may be in the form of an organic medium which contains the organic solvent as a main component. The content of the organic solvent in the whole organic medium is preferably 80% by weight or more, more preferably 90% by weight or more, still more preferably 95% by weight or more and especially preferably substantially 100% by weight.

Examples of the organic solvent include dialkyl ketones such as acetone, methyl ethyl ketone, diethyl ketone, dipropyl ketone, methyl isobutyl ketone and methyl isopropyl ketone. Among these organic solvents, from the viewpoints of homogeneous dispersion of the mixed polyester and easiness in the below-mentioned removal of the organic solvent by distillation, methyl ethyl ketone is preferred.

The amount of the organic solvent used is preferably from 100 to 300 parts by weight, more preferably from 100 to 200 parts by weight and still more preferably from 100 to 180 parts by weight on the basis of 100 parts by weight of the mixed polyester from the viewpoints of fully emulsifying the mixed polyester and reducing environmental burden. Even though the trivalent or higher-valent carboxylic acid component is used as a raw material component of the amorphous polyester in a predetermined amount or more, the viscosity of the resulting mixed polyester can be reduced by mixing the amorphous polyester with the crystalline polyester. As a result, it becomes possible to prepare the homogeneous polyester particles even when using a very small amount of the organic solvent as compared to conventional methods.

In addition, from the viewpoint of enhancing an emulsification stability of the mixed polyester, the mixed polyester is preferably emulsified in the presence of a surfactant. Examples of the surfactant include the same surfactants as illustrated in the emulsifying step A.

The dispersion of polyester particles obtained in the emulsifying step B may contain the same additives as used in the emulsifying step A, if required. The contents of the additives may also be the same as used in the emulsifying step A.

As the method of carrying out the emulsifying step B, there is preferably used the method in which after charging the mixed polyester and the organic solvent, if required, together with the above optional additives into a single vessel and mixing these components together, an aqueous alkali solution and an aqueous medium are further added to the resulting mixture to emulsify the mixed polyester and the additives therein.

The concentration and kind of the aqueous alkali solution used in the emulsifying step B may be the same as those described in the emulsifying step A. The preferred concentration range and preferred kind of the aqueous alkali solution may also be the same as those described in the emulsifying step A.

The mixing time is preferably from 1 to 24 h, more preferably from 2 to 12 h, still more preferably from 3 to 10 h and further still more preferably from 3 to 6 h from the viewpoints of a good dispersibility and a high productivity of the mixed polyester. Also, the stirring temperature is preferably not lower than 20° C. and not higher than a boiling point of the organic solvent used.

The velocity of addition of the aqueous alkali solution is preferably from 0.1 to 50 parts by weight/min, more preferably from 0.1 to 30 parts by weight/min, still more preferably from 0.5 to 10 parts by weight/min and especially preferably from 0.5 to 5 parts by weight/min on the basis of 100 parts by weight of the mixed polyester from the viewpoint of obtaining the polyester particles having a uniform particle size with a high productivity.

After the mixed polyester is dispersed, if required, together with the additives, in the organic solvent, the obtained dispersion is neutralized at a temperature of a boiling point of the organic solvent, and then the aqueous medium is added to the dispersion at a temperature not higher than the boiling point of the organic solvent used from the viewpoint of a high production stability. The kind and amount of the aqueous medium as well as the velocity of addition thereof may be the same as those described in the emulsifying step A.

After adding the aqueous medium, the organic solvent is removed by distillation from the resulting emulsion to thereby produce the dispersion of polyester particles. The removal of the organic solvent is preferably carried out by heating the emulsion under reduced pressure. The temperature used upon the removal of the organic solvent by distillation is preferably not higher than the boiling point of the organic solvent used from the viewpoint of a high production stability.

The present invention also relates to the dispersion of polyester particles obtained by the above process.

The volume median particle size ($D_{50}$) of the polyester particles contained in the thus prepared dispersion of polyester particles may be appropriately determined according to the particle size of the toner obtained from the dispersion of polyester particles, and is preferably from 0.02 to 2 μm, more preferably from 0.05 to 1 μm and still more preferably from 0.05 to 0.5 μm from the viewpoint of a high image density of the resulting toner. Meanwhile, the volume median particle size ($D_{50}$) as used herein means a particle size at which a cumulative volume frequency calculated on the basis of a volume fraction of particles from a smaller particle size side thereof is 50%. Thus, the polyester particles produced through the emulsifying step A or B have a small particle size, and the toner obtained from the polyester particles has a uniform particle size distribution and is excellent in low-temperature fusing property and anti-hot offset property.

The coefficient of variation of particle size distribution (CV value) of the polyester particles is preferably 35% or less, more preferably 30% or less and still more preferably 28% or less from the viewpoint of a high image density of the resulting toner.

[Toner for Electrophotography]

The toner for electrophotography according to the present invention is obtained by aggregating the polyester particles contained in the above prepared dispersion of polyester particles (hereinafter referred to as an "aggregating step") and then coalescing the resulting aggregated particles (hereinafter referred to as a "coalescing step").

Meanwhile, the toner is preferably produced by using the dispersion of polyester particles which is obtained through the emulsifying step A from the viewpoint of a good low-temperature fusing property of the resulting toner.

(Aggregating Step)

In the aggregating step, in order to effectively carry out the aggregation, an aggregating agent is preferably added. Examples of the aggregating agent used in the present invention include organic aggregating agents such as a cationic surfactant in the form of a quaternary salt and polyethyleneimine, and inorganic aggregating agents such as an inorganic metal salt, an inorganic ammonium salt and a divalent or higher-valent metal complex.

The inorganic metal salts include, for example, metal salts such as sodium sulfate, sodium chloride, calcium chloride and calcium nitrate; and inorganic metal salt polymers such as poly(aluminum chloride) and poly(aluminum hydroxide). Specific examples of the inorganic ammonium salts include ammonium sulfate, ammonium chloride and ammonium nitrate.

Among these aggregating agents, from the viewpoint of controlling a particle size of the toner with a high accuracy and achieving a sharp particle size distribution thereof, a monovalent salt is preferably used. The "monovalent salt" as used herein means that a valence of a metal ion or a cation constituting the salt is 1. Examples of the monovalent salt as the aggregating agent include organic aggregating agents such as cationic surfactants in the form of a quaternary salt, and inorganic aggregating agents such as inorganic metal salts and ammonium salts. In the present invention, among these aggregating agents, water-soluble nitrogen-containing compounds having a molecular weight of 350 or less are preferably used.

As the water-soluble nitrogen-containing compounds having a molecular weight of 350 or less, there may be used, for example, ammonium salts such as ammonium halides, ammonium sulfate, ammonium acetate, ammonium benzoate and ammonium salicylate; and quaternary ammonium salts such as tetraalkyl ammonium halides. From the viewpoint of a good productivity, among these compounds, preferred are ammonium sulfate (pH value of 10 wt % aqueous solution at 25° C. (hereinafter referred to merely as a "pH"): 5.4), ammonium chloride (pH: 4.6), tetraethyl ammonium bromide (pH: 5.6) and tetrabutyl ammonium bromide (pH: 5.8).

The amount of the aggregating agent used is preferably 50 parts by weight or less, more preferably 40 parts by weight or less and still more preferably 30 parts by weight or less on the basis of 100 parts by weight of the mixed polyester from the viewpoint of a good tribocharge property of the toner (in particular, the tribocharge property under high-temperature and high-humidity conditions), i.e., a good stability of image quality of the resulting toner. Also, from the viewpoint of a good aggregating property, the amount of the aggregating agent used is preferably 1 part by weight or more, more preferably 3 parts by weight or more, and still more preferably 5 parts by weight or more on the basis of 100 parts by weight of the mixed polyester. From the above viewpoints, the amount of the monovalent salt used as the aggregating agent is preferably from 1 to 50 parts by weight, more preferably from 3 to 40 parts by weight and still more preferably from 5 to 30 parts by weight on the basis of 100 parts by weight of the mixed polyester.

After suitably controlling the pH value of the reaction system, the aggregating agent is preferably added at a temperature not higher than the "glass transition temperature of the amorphous polyester+(plus) 20° C.", more preferably not higher than the "glass transition temperature of the amorphous polyester+(plus) 10° C.", and still more preferably lower than the "glass transition temperature of the amorphous polyester+(plus) 5° C.". When adding the aggregating agent in the above-specified temperature range, it is possible to homogeneously aggregate the polyester particles with a narrow particle size distribution.

In addition, the addition of the aggregating agent is preferably carried out at a temperature not lower than the "softening point of the amorphous polyester–(minus) 100° C." and more preferably not lower than the "softening point of the amorphous polyester–(minus) 90° C.". From the viewpoint of achieving both a good dispersion stability of the mixed dispersion and a good aggregating property of the polyester particles, the pH value of the reaction system upon addition of the aggregating agent is preferably from 2 to 10, more preferably from 2 to 8 and still more preferably from 3 to 7.

Also, from the same viewpoints as described above, the temperature of the reaction system in the aggregating step is preferably in the range of from the "softening point of the amorphous polyester–(minus) 50° C." to the "softening point of the amorphous polyester–(minus) 10° C." and more preferably from the "softening point of the amorphous polyester–(minus) 30° C." to the "softening point of the amorphous polyester–(minus) 10° C.".

In addition, from the viewpoint of enhancing a stability of the aggregated particles contained in the thus obtained dispersion of aggregated particles, the temperature of the reaction system in the aggregating step is preferably not lower than the glass transition temperature of the polyester particles contained in the dispersion of polyester particles, more preferably not lower than the "glass transition temperature of the polyester particles+(plus) 3° C." and still more preferably not lower than the "glass transition temperature of the polyester particles+(plus) 5° C.". When the temperature of the reaction system in the aggregating step is controlled to the above-specified range, the polyester particles forming the aggregated particles are partially fused together, so that the obtained aggregated particles are allowed to be stably present in the dispersion while maintaining their aggregated state.

The aggregating agent may be added in the form of a solution thereof in an aqueous medium. In addition, the aggregating agent may be added to the dispersion at one time, or may be added intermittently or continuously. Further, upon and after adding the aggregating agent, in particular, the aggregating agent in the form of a monovalent salt, the obtained dispersion is preferably fully stirred.

Thus, the polyester particles contained in the dispersion of polyester particles are aggregated together to prepare aggregated particles.

From the viewpoint of reduction in particle size, the volume median particle size ($D_{50}$) of the aggregated particles is preferably from 1 to 10 μm, more preferably from 2 to 9 μm and still more preferably from 2 to 5 μm, and the coefficient of variation of particle size distribution (CV value) of the aggregated particles is preferably 30% or less, more preferably 28% or less and still more preferably 25% or less.

In the present invention, after aggregating the polyester particles, a surfactant is preferably added to the resulting dispersion. More preferably, at least one compound selected from the group consisting of alkylethersulfates, alkylsulfates and straight-chain alkylbenzenesulfonates is added to the dispersion.

The above surfactant is preferably added in an amount of from 0.1 to 15 parts by weight, more preferably from 0.1 to 10 parts by weight and still more preferably from 0.1 to 8 parts by weight on the basis of 100 parts by weight of a total amount of whole polyesters constituting the aggregated particles from the viewpoints of a good aggregation stopping property and a less residual amount of the surfactant in the toner.

In the present invention, from the viewpoints of preventing bleed-out of additives such as a releasing agent in the aggregating step and the subsequent coalescing step and maintaining tribocharge of respective colors in a color toner at the same level, etc., in the aggregating step, a dispersion of other resin fine particles may be added to the dispersion of polyester particles at one time, or may be added intermittently in plural divided parts. Further, in the case where the dispersion of the other resin fine particles is also subjected to the aggregating step and the coalescing step upon production of the toner, from the same viewpoints as described above, in the aggregating step, the dispersion of polyester particles according to the present invention may be added to the dispersion of the other resin fine particles at one time, or may be added thereto intermittently in plural divided parts.

The other resin fine particles may be the same as or different from the polyester particles contained in the dispersion of polyester particles according to the present invention. However, from the viewpoints of a good low-temperature fusing property and a good storage stability of the resulting toner, the other resin fine particles are preferably polyester particles which are different from the polyester particles contained in the dispersion of polyester particles obtained according to the present invention, and more preferably polyester particles constituted of an amorphous polyester.

In the aggregating step, when the dispersion of the other resin fine particles is added to the dispersion of polyester particles according to the present invention (hereinafter occasionally referred to as a "encapsulation step"), both the dispersions are preferably mixed with each other after forming the aggregated particles by adequately adding the aggregating agent to the dispersion of polyester particles according to the present invention as described above (in this case, the aggregated particles obtained by adding the aggregating agent to the dispersion of polyester particles are occasionally referred to as "core particles"; the particles coated on the respective core particles are occasionally referred to as "shell particles"; and the finally obtained aggregated particles are occasionally referred to as "encapsulated aggregated particles").

In the present invention, the time of addition of the dispersion of the other resin fine particles to the dispersion of the aggregated particles is not particularly limited, and is preferably during a period of from completion of addition of the aggregating agent to initiation of the subsequent coalescing step from the viewpoint of a high productivity.

In the above encapsulation step, the temperature of the dispersion containing the aggregated particles and the other resin fine particles upon adding the dispersion of the other resin fine particles to the dispersion of the aggregated particles (i.e., the mixed dispersion obtained by adding the dispersion of the other resin fine particles to the dispersion of the aggregated particles) is preferably not higher than a glass transition temperature of the other resin fine particles contained in the dispersion of the other resin fine particles to be added, from the viewpoint of obtaining the encapsulated aggregated particles having a sharp particle size distribution. When the encapsulation step is carried out at a temperature higher than the above-specified temperature, there tends to occur aggregation and fusion between the aggregated particles themselves, between the encapsulated aggregated particles themselves or between the aggregated particles and the encapsulated aggregated particles, resulting in aggregation and fusion between the aggregated particles to which the resin fine particles are adhered. As a result, the obtained particles tend to contain a large amount of coarse particles and therefore have a broad particle size distribution. In consequence, the above temperature upon the encapsulation step is preferably not higher than the glass transition temperature of the other resin fine particles contained in the dispersion of the other resin fine particles to be added, more preferably not higher than the "glass transition temperature of the other resin fine particles–(minus) 3° C." and still more preferably not higher than the "glass transition temperature of the other resin fine particles–(minus) 5° C.", and further is preferably not lower than 10° C. and more preferably not lower than 15° C. from the viewpoint of maintaining a good dispersing condition of the resulting dispersion.

In the encapsulation step, the polyester particles used in the present invention may also be mixed with aggregated particles obtained by adding the aggregating agent to the above dispersion of the other resin fine particles.

The mixing ratio of the polyester particles used in the present invention to the other resin fine particles (polyester particles used in the present invention/other resin fine particles) is preferably from 0.1 to 2, more preferably from 0.2 to 1.5 and still more preferably from 0.3 to 1 in terms of a weight ratio therebetween from the viewpoint of achieving both of a good low-temperature fusing property and a good storage stability of the resulting toner.

In the present invention, a compound having a functional group capable of reacting with a carboxyl group of the polyester may be added to the dispersion of polyester particles obtained according to the present invention and/or the dispersion of the aggregated particles to subject the polyester particles and/or the aggregated particles to crosslinking reaction on the surface thereof, so that the resulting toner can be enhanced in molecular weight and softening point thereof and therefore effectively improved in anti-hot offset property. Examples of the compound having a functional group capable of reacting with a carboxyl group of the polyester include those compounds having an oxazoline group, a glycidyl group, an aziridyl group or a carbodiimide group.

The thus obtained aggregated particles are then subjected to the coalescing step.

(Coalescing Step)

In the coalescing step, the aggregated particles obtained in the above aggregating step are coalesced.

In the present invention, the aggregated particles obtained in the aggregating step are heated to obtain coalesced particles thereof. In the coalescing step, the temperature of the reaction system is preferably controlled to the same temperature as used in the reaction system of the aggregating step or higher. The temperature of the reaction system used in the coalescing step is more preferably in the range of from the glass transition temperature of the amorphous polyester to the "softening point of the amorphous polyester+(plus) 20° C."; more preferably from the "glass transition temperature of the amorphous polyester+(plus) 5° C." to the "softening point of the amorphous polyester+(plus) 15° C."; and still more preferably from the "glass transition temperature of the amorphous polyester+(plus) 10° C." to the "softening point of the amorphous polyester+(plus) 10° C.", from the viewpoints of well controlling a particle size, a particle size distribution and a shape of the toner as aimed, and attaining a good fusibility of the aggregated particles. In addition, the stirring rate used in the coalescing step is preferably a rate at which the aggregated particles are not precipitated.

In the present invention, the coalescing step may be carried out simultaneously with the aggregating step, for example, in the following manners.

(1) Continuously raising the temperature of the reaction system; or (2) Raising the temperature of the reaction system to the temperature at which both the aggregation and the coalescing can be performed and then continuously stirring the reaction system at that temperature.

The volume median particle size ($D_{50}$) of the coalesced particles is preferably from 2 to 10 μm, more preferably from 2 to 8 μm, still more preferably from 2 to 7 μm and especially preferably from 3 to 8 μm from the viewpoint of a high image quality of the resulting toner.

The thus obtained coalesced particles may be appropriately subjected to a liquid-solid separation step such as filtration, a washing step and a drying step to thereby obtain toner particles. In this case, in the washing step, the coalesced particles are preferably washed with an acid to remove metal ions from the surface of the respective toner particles for the purpose of ensuring sufficient tribocharge and a good reliability of the resultant toner. In the washing step, the coalesced particles are preferably washed so as to completely remove the nonionic surfactant added therefrom. Therefore, the coalesced particles are preferably washed with an aqueous solution at a temperature not higher than a cloud point of the nonionic surfactant. Meanwhile, the washing procedure is preferably repeated a plurality of times.

In addition, in the drying step, any optional methods such as vibration-type fluidization drying method, spray-drying method, freeze-drying method and flash jet method may be employed. The content of water in the toner particles obtained after drying is preferably adjusted to 1.5% by weight or less and more preferably 1.0% by weight or less from the viewpoint of a good tribocharge property of the resulting toner.

The toner for electrophotography according to the present invention contains the thus obtained coalesced particles (toner particles).

The volume median particle size ($D_{50}$) of the toner particles is preferably from 1 to 10 μm, more preferably from 2 to 8 μm and still more preferably from 3 to 7 μm from the viewpoints of a high image quality and a high productivity of the resulting toner. The coefficient of variation of particle size distribution (CV value) of the toner particles is preferably 30% or less, more preferably 27% or less and still more preferably 25% or less from the viewpoints of a high image quality and a high productivity of the resulting toner.

The softening point of the toner is preferably from 60 to 140° C., more preferably from 60 to 130° C. and still more preferably from 60 to 120° C. from the viewpoint of a good low-temperature fusing property of the resulting toner. Also, the glass transition temperature of the toner is preferably from 30 to 80° C. and more preferably from 40 to 70° C. from the viewpoint of a good durability of the resulting toner.

The thus obtained toner in the form of toner particles may be directly used as a toner, or an auxiliary agent (external additive) such as a fluidizing agent may be added to treat the surface of the toner particles therewith to obtain the toner. As the external additive, there may be used known fine particles. Examples of the fine particles as the external additive include inorganic fine particles such as fine silica particles whose surface is subjected to a hydrophobic treatment, fine titanium oxide particles, fine alumina particles, fine cerium oxide particles and carbon blacks; and fine polyester particles such as fine particles made of polycarbonates, polymethyl methacrylate, silicone resins, etc.

When the surface of the toner particles is treated with the external additive, the amount of the external additive added is preferably from 1 to 5 parts by weight and more preferably from 1.5 to 3.5 parts by weight on the basis of 100 parts by weight of the toner particles before being treated with the external additive. However, when a hydrophobic silica is used as the external additive, the hydrophobic silica is preferably added in an amount of from 1 to 3 parts by weight on the basis of 100 parts by weight of the toner particles before being treated with the external additive.

The toner for electrophotography obtained according to the present invention may be used in the form of a one-component system developer or a tow-component system developer formed by mixing the toner with a carrier.

EXAMPLES

In the following Examples, various properties were measured and evaluated by the following methods.

[Acid Value of Polyester]

Determined according to JIS K0070. However, with respect to the solvent for the measurement, the mixed solvent of ethanol and ether was replaced with a mixed solvent containing acetone and toluene at a volume ratio of 1:1.

[Softening Point, Melting Point and Glass Transition Temperature of Polyester]

(1) Softening Point

Using a flow tester "CFT-500D" available from Shimadzu Seisakusho Co., Ltd., 1 g of a sample was extruded through a nozzle having a die pore diameter of 1 mm and a length of 1 mm while heating the sample at a temperature rise rate of 6° C./min and applying a load of 1.96 MPa thereto by a plunger. The softening point was determined as the temperature at which a half amount of the sample was flowed out when plotting a downward movement of the plunger of the flow tester relative to the temperature.

(2) Endothermic Highest Peak Temperature and Melting Point

Using a differential scanning calorimeter ("DSC 210" commercially available from Seiko Instruments, Inc.), a sample was heated to 200° C. and then cooled from 200° C. to 0° C. at a temperature drop rate of 10° C./min, and thereafter heated again at a temperature rise rate of 10° C./min to measure and prepare an endothermic curve thereof. The temperature of the peak observed on a highest temperature side among all the peaks observed in the endothermic curve, was determined as an endothermic highest peak temperature of the sample. When the difference between the highest peak temperature and the softening point was within 20° C., the peak temperature was determined as the melting point of the sample. Whereas, when the highest peak temperature was lower by 20° C. or more than the softening point, the peak was regarded as being attributed to glass transition.

(3) Glass Transition Temperature

Using a differential scanning calorimeter ("Pyris 6 DSC" available from Perkin Elmer, Inc.), a sample was heated to 200° C. and then cooled from 200° C. to 0° C. at a temperature drop rate of 10° C./min, and thereafter heated again at a temperature rise rate of 10° C./min to measure a glass transition temperature thereof. When a peak was observed at a temperature lower by 20° C. or more than the softening point, the peak temperature was read as the glass transition temperature. Whereas, when a shift of the characteristic curve was observed without any peaks at the temperature lower by 20°

C. or more than the softening point, the temperature at which a tangential line having a maximum inclination of the curve in the portion of the curve shift was intersected with an elongation of a baseline on the high-temperature side of the curve shift was read as the glass transition temperature.

[Number-Average Molecular Weight]

The number-average molecular weight was calculated from the molecular weight distribution measured by gel permeation chromatography according to the following method.

(1) Preparation of Sample Solution

The polyester was dissolved in chloroform to prepare a solution having a concentration of 0.5 g/100 mL. The resultant solution was then filtered through a fluororesin filter ("FP-200" commercially available from Sumitomo Electric Industries, Ltd.) having a pore size of 2 μm to remove insoluble components therefrom, thereby preparing a sample solution.

(2) Measurement of Molecular Weight Distribution

Tetrahydrofuran as an eluent was allowed to flow through a column at a flow rate of 1 mL/min, and the column was stabilized in a thermostat at 40° C. One hundred microliters of the sample solution was injected to the column to determine a molecular weight distribution of the sample. The molecular weight of the sample was calculated on the basis of a calibration curve previously prepared. The calibration curve of the molecular weight was prepared by using several kinds of monodisperse polystyrenes (those polystyrenes having molecular weights of $2.63 \times 10^3$, $2.06 \times 10^4$ and $1.02 \times 10^5$ available from Tosoh Corporation; and those polystyrenes having molecular weights of $2.10 \times 10^3$, $7.00 \times 10^3$ and $5.04 \times 10^4$ available from GL Science Co., Ltd.) as standard samples.

Analyzer: CO-8010 (commercially available from Tosoh Corp.)

Column: GMHLX+G3000HXL (commercially available from Tosoh Corp.)

[Volume Median Particle Size and Particle Size Distribution of Polyester Particles]

(1) Measuring Apparatus: Laser diffraction particle size analyzer ("LA-920" commercially available from Horiba Seisakusho Co., Ltd.)

(2) Measuring Conditions: Using a cell for the measurement which was filled with distilled water, a volume median particle size ($D_{50}$) of the particles was measured at a temperature at which an absorbance thereof was within an adequate range. Also, the CV value was calculated according to the following formula:

CV Value(%)=(Standard Deviation of Particle Size Distribution/Volume Median Particle Size($D_{50}$))×100.

[Solid Content of Dispersion of Polyester Particles]

Using an infrared moisture meter ("FD-230" available from Kett Electric Laboratory), 5 g of the dispersion of polyester particles was dried at 150° C. under a measuring mode 96 (monitoring time: 2.5 min; fluctuating range: 0.05%), and the water content (%) of the dispersion was measured. The solid content of the dispersion was calculated according to the following formula.

Solid Content(wt %)=100−$M$ wherein M is a water content (%) of the dispersion represented by the following formula:

$M=[(W-W_0)/W]\times 100$ wherein W is a weight of the sample before measurement (initial weight of the sample); and $W_0$ is a weight of the sample after measurement (absolute dry weight of the sample).

[Volume Median Particle Size and Particle Size Distribution of Toner]

Measuring Apparatus: Coulter Multisizer III (commercially available from Beckman Coulter Inc.)

Aperture Diameter: 50 μm

Analyzing Software: Multisizer III Ver. 3.51 (commercially available from Beckman Coulter Inc.)

Electrolyte Solution: "Isotone II" (commercially available from Beckman Coulter Inc.)

Dispersing Solution: The solution was prepared by dissolving "EMULGEN (registered trademark) 109P" (commercially available from Kao Corporation; polyoxyethylene lauryl ether; HLB: 13.6) in the above electrolyte solution such that the concentration of "EMULGEN 109P" in the obtained solution was 5% by weight.

Dispersing Conditions: Ten milligrams of a sample to be measured were added to 5 mL of the above dispersing solution, and dispersed therein using an ultrasonic disperser for 1 min. Thereafter, 25 mL of the electrolyte solution were added to the dispersion, and the obtained mixture was further dispersed using the ultrasonic disperser for 1 min to prepare a sample dispersion.

Measuring Conditions: The thus prepared sample dispersion was added to 100 mL of the electrolyte solution, and after controlling a concentration of the resulting dispersion such that the measurement of particle sizes of 30000 particles was completed within 20 s, the particle sizes of 30000 particles were measured under such a concentration condition, and a volume median particle size ($D_{50}$) thereof was determined from the particle size distribution.

Also, the CV value (%) was calculated according to the following formula:

CV Value(%)=(Standard Deviation of Particle Size Distribution/Volume median Particle Size($D_{50}$))×100.

[Glass Transition Temperature of Polyester Particles and Glass Transition Temperature of Other Resin Fine Particles]

When measuring the glass transition temperature of the polyester particles contained in the dispersion of polyester particles, the solvent was first removed by freeze-drying the dispersion of polyester particles, and then the obtained solid was subjected to measurement of a glass transition temperature thereof.

The freeze-drying of the dispersion of polyester particles was carried out as follows. That is, using a freeze dryer ("FDU-2100" and "DRC-1000" both available from Tokyo Rika Kiki Co., Ltd.), 30 g of the resin dispersion were vacuum-dried at −25° C. for 1 h, at −10° C. for 10 h and then at 25° C. for 4 h until the water content therein reached 1% or less. The water content of the thus obtained sample was measured as follows. That is, using an infrared moisture meter "FD-230" (available from Kett Electric Laboratory), 5 g of the sample obtained after the drying was dried at 150° C. under a measuring mode 96 (monitoring time: 2.5 min/fluctuating range: 0.05%) to measure a water content (%) thereof.

Meanwhile, the glass transition temperature of the other resin fine particles contained in the dispersion of the other resin fine particles was measured by the same method as used above for measuring the glass transition temperature of the polyester particles.

[Evaluation of Low-Temperature Fusing Property and Anti-Hot Offset Property of Toner]

Image was outputted and printed on a plain paper ("J Paper" available from Fuji Xerox Corp.; size: A4) using a commercially available printer ("ML5400" available from Oh Data Co., Ltd.). The image thus outputted was an unfused solid image having a length of 50 mm which was printed on the A4 paper except for its top margin of the A4 paper extending 5 mm from a top end thereof such that an amount of the toner deposited on the paper was 0.45±0.03 mg/cm$^2$. The thus obtained unfused image on the paper was fused by passing the paper through a fuser mounted in the printer which was modified so as to variably control its fusing temperature, at a temperature-fusing speed of 40 sheets/min (in the longitudinal direction of the A4 paper). The thus fused image was evaluated for its low-temperature fusing property by the following tape peeling method.

A mending tape ("Scotch Mending Tape 810" available from 3M; width: 18 mm) was cut into a length of 50 mm and lightly attached to the top margin of the paper above an upper end of the fused image. Then, a weight of 500 g was rested on the tape and reciprocated by one stroke over the tape at a speed of 10 mm/s while press-contacting the weight thereon. Thereafter, the attached tape was peeled off from its lower end at a peeling angle of 180° and a peeling speed of 10 mm/s. The reflection image densities before and after attaching the tape to the fused image were measured by the above method, and the fusing rate of the toner was calculated from the thus measured reflection image densities according to the following formula.

Fusing Rate=(Image density after peeling off the tape/
Image density before attaching the tape)×100

The fusing rate at which the image density after peeling off the tape is the same value as the image density before attaching the tape is regarded as being 100.

The above test was carried out at the respective fusing temperatures set at intervals of 5° C. in the temperature range of from the fusing temperature at which cold offset occurred or the fusing rate became less than 90 to the fusing temperature at which hot offset occurred. Meanwhile, the "cold offset" as used herein means such a phenomenon that when the fusing temperature is low, the toner of an unfused image fails to be sufficiently melted and is attached onto a fuser roller. On the other hand, the "hot offset" as used herein means such a phenomenon that when the fusing temperature is high, the toner of an unfused image is deteriorated in viscosity and attached onto a fuser roller. The occurrence of the "cold offset" or "hot offset" may be ascertained by observing whether or not after one rotation of the fuser roller, any toner is attached again onto the paper. In the above test, the occurrence of the "cold offset" or "hot offset" was ascertained by observing whether or not any deposition of the toner occurred on a portion of the paper located 87 mm from an upper end of the solid image.

In the above method, the hot offset generating temperature means the temperature at which the hot offset is initiated. Whereas, the lowest fusing temperature means the lowest temperature among those temperatures at which no cold offset occurs, or the fusing rate is 90 or more.

Production Example 1

Production of Crystalline Polyester (a)

A four-necked flask equipped with a nitrogen inlet tube, a dehydration tube, a stirrer and a thermocouple was charged with 2478 g of 1,6-hexanediol, 1456 g of 1,5-pentanediol, 5926 g of terephthalic acid and 20 g of dibutyl tin oxide, and the contents of the flask were reacted with each other at 200° C. until granular terephthalic acid was no longer observed, and further reacted under a pressure of 8.3 kPa for 1 h, thereby obtaining a crystalline polyester (a). Properties of the thus obtained crystalline polyester (a) are shown in Table 1.

Production Example 2

Production of Crystalline Polyester (b)

A four-necked flask equipped with a nitrogen inlet tube, a dehydration tube, a stirrer and a thermocouple was charged with 2478 g of 1,6-hexanediol, 1456 g of 1,5-pentanediol, 5229 g of terephthalic acid and 45 g of tin dioctylate, and the contents of the flask were reacted with each other at 200° C. until granular terephthalic acid was no longer observed, and further reacted under a pressure of 8.3 kPa for 1 h, thereby obtaining a crystalline polyester (b). Properties of the thus obtained crystalline polyester (b) are shown in Table 1.

Production Example 3

Production of Amorphous Polyester (c)

A four-necked flask equipped with a nitrogen inlet tube, a dehydration tube, a stirrer and a thermocouple was charged with 1750 g of polyoxypropylene(2.2)-2,2-bis(4-hydroxyphenyl)propane, 1625 g of polyoxyethylene(2.0)-2,2-bis(4-hydroxyphenyl)propane, 1145 g of terephthalic acid, 161 g of dodecenyl succinic anhydride, 480 g of trimellitic anhydride and 10 g of dibutyl tin oxide, and the contents of the flask were reacted with each other while stirring at 220° C. in a nitrogen atmosphere, and the reaction was terminated when the softening point as measured according to ASTM D36-86 reached 120° C., thereby obtaining an amorphous polyester (c). Properties of the thus obtained amorphous polyester (c) are shown in Table 1.

Production Example 4

Production of Amorphous Polyester (d)

A four-necked flask equipped with a nitrogen inlet tube, a dehydration tube, a stirrer and a thermocouple was charged with 3374 g of polyoxypropylen (2.2)-2,2-bis(4-hydroxyphenyl)propane, 33 g of polyoxyethylene (2.0)-2,2-bis(4-hydroxyphenyl)propane, 672 g of terephthalic acid and 10 g of dibutyl tin oxide, and the contents of the flask were reacted with each other at 230° C. under normal pressures in a nitrogen atmosphere for 5 h, and further reacted under reduced pressure. After the obtained reaction mixture was cooled to 210° C., 696 g of fumaric acid and 0.49 g of tert-butyl catechol were added thereto to conduct a reaction therebetween for 5 h, and further the reaction was conducted under reduced pressure, thereby obtaining an amorphous polyester (d). Properties of the thus obtained amorphous polyester (d) are shown in Table 1.

Production Example 5

Production of Crystalline Polyester (e)

A four-necked flask equipped with a nitrogen inlet tube, a dehydration tube, a stirrer and a thermocouple was charged with 4809 g of 1,9-nonanediol, 4482 g of terephthalic acid and 50 g of tin dioctylate, and the contents of the flask were reacted with each other at 200° C. until granular terephthalic acid was no longer observed, and further reacted under a pressure of 8.3 kPa for 1 h, thereby obtaining a crystalline polyester (e). Properties of the thus obtained crystalline polyester (e) are shown in Table 1.

Production Example 6

Production of Amorphous Polyester (f)

A four-necked flask equipped with a nitrogen inlet tube, a dehydration tube, a stirrer and a thermocouple was charged with 2450 g of polyoxypropylene (2.2)-2,2-bis(4-hydroxyphenyl) propane, 975 g of polyoxyethylene(2.0)-2,2-bis(4-hydroxyphenyl)propane, 951 g of fumaric acid, 346 g of trimellitic anhydride and 10 g of dibutyl tin oxide, and the contents of the flask were reacted with each other while stirring at 220° C. in a nitrogen atmosphere, and the reaction was terminated when the softening point as measured according to ASTM D36-86 reached 88° C., thereby obtaining an amorphous polyester (1). Properties of the thus obtained amorphous polyester (f) are shown in Table 1.

Production Example 7

Production of Amorphous Polyester (g)

A four-necked flask equipped with a nitrogen inlet tube, a dehydration tube, a stirrer and a thermocouple was charged with 3500 g of polyoxypropylene(2.2)-2,2-bis(4-hydroxyphenyl)propane, 812 g of fumaric acid, 384 g of trimellitic anhydride and 10 g of dibutyl tin oxide, and the contents of the flask were reacted with each other while stirring at 220° C. in a nitrogen atmosphere, and the reaction was terminated when the softening point as measured according to ASTM D36-86 reached 114° C., thereby obtaining an amorphous polyester (g). Properties of the thus obtained amorphous polyester (g) are shown in Table 1.

Example 1

Production of Dispersion 1 of Polyester Particles

A 5 L vessel was charged with 180 g of the crystalline polyester (a), 210 g of the amorphous polyester (c), 210 g of the amorphous polyester (d), 30 g of a copper phthalocyanine pigment ("ECB-301" available from Dainichiseika Color & Chemicals Mfg. Co., Ltd.), 8.5 g of a nonionic surfactant ("EMULGEN (registered trademark) 150" available from Kao Corp.), 40 g of an anionic surfactant ("NEOPELEX (registered trademark) G-15" available from Kao Corp.; 15 wt % aqueous solution of sodium dodecylbenzenesulfonate) and 67 g of a 20 wt % potassium hydroxide aqueous solution, and the contents of the vessel were melted at 98° C. for 2 h while stirring with a paddle-shaped stirrer at a rate of 200 rpm, thereby obtaining a resin binder mixture.

Next, while stirring with a paddle-shaped stirrer at a rate of 200 rpm, 1347 g in total of deionized water were added dropwise into the vessel at a rate of 6 g/min to prepare a dispersion of polyester particles. Finally, the obtained dispersion was cooled to room temperature and passed through a wire mesh having a 200 mesh screen (aperture: 105 μm) to obtain a dispersion 1 of polyester particles (hereinafter occasionally referred to merely as a "dispersion 1"). The volume median particle size ($D_{50}$), CV value, solid content and glass transition temperature of the polyester particles contained in the thus obtained dispersion 1 of polyester particles are shown in Table 2.

Example 2

Production of Dispersion 2 of Polyester Particles

The same procedure as in Example 1 was repeated except that the amounts of the amorphous polyester (c) and the

TABLE 1

| | | Production Examples | | | | | | |
|---|---|---|---|---|---|---|---|---|
| | | 1 Crystalline polyester (a) | 2 Crystalline polyester (b) | 3 Amorphous polyester (c) | 4 Amorphous polyester (d) | 5 Crystalline polyester (e) | 6 Amorphous polyester (f) | 7 Amorphous polyester (g) |
| Monomers | Alcohol component | | | | | | | |
| | BPA-PO*[1] | | | 1750 g (50) | 3374 g (96.4) | | 2450 g (70) | 3500 g (100) |
| | BPA-EO*[2] | | | 1625 g (50) | 33 g (1) | | 975 g (30) | |
| | 1,9-Nonanediol | | | | | 4809 g (100) | | |
| | 1,6-Hexanediol | 2478 g (60) | 2478 g (60) | | | | | |
| | 1,5-Pentanediol | 1456 g (40) | 1456 g (40) | | | | | |
| | Acid component | | | | | | | |
| | Terephthalic acid | 5926 g (102) | 5229 g (90) | 1145 g (69) | 672 g (40.5) | 4482 g (90) | | |
| | Fumaric acid | | | | 696 g (60) | | 951 g (82) | 812 g (70) |
| | Dodecenyl succinic anhydride | | | 116 g (6) | | | | |
| | Trimellitic anhydride | | | 480 g (25) | | | 346 g (18) | 384 g (20) |
| Esterification catalyst | Dibutyl tin oxide | 20 g | | 10 g | 10 g | | 10 g | 10 g |
| | Tin dioctylate | | 45 g | | | 50 g | | |
| Softening point (° C.) | | 96 | 86 | 122 | 107 | 85 | 89 | 115 |
| Glass transition temperature (° C.) | | — | — | 65 | 65 | — | 50 | 62 |
| Melting point (° C.) | | 95 | 93 | — | — | 93 | — | — |
| Acid value (mg KOH/g) | | 21.9 | 3.3 | 21.0 | 24.4 | 22.1 | 28 | 28 |
| Number · average molecular weight | | $5.1 \times 10^3$ | $3.9 \times 10^3$ | $3.4 \times 10^3$ | $3.8 \times 10^3$ | $2.7 \times 10^3$ | $2.4 \times 10^3$ | $4.0 \times 10^3$ |
| Crystallinity index | | 1.0 | 0.9 | 1.6 | 1.5 | 0.9 | 1.6 | 1.6 |

Note
Numerals in parentheses each indicate a molar ratio.
*[1]Polyoxypropylene(2.2)-2,2-bis(4-hydroxyphenyl)propane
*[2]Polyoxyethylene(2.0)-2,2-bis(4-hydroxyphenyl)propane amorphous polyester (d) were changed to 150 g and 270 g, respectively, the amount of the 20 wt % potassium hydroxide aqueous solution was changed from 67 g to 68 g, and the total amount of the deionized water to be dropped was changed to 1345 g, thereby obtaining a dispersion 2 of polyester particles (hereinafter occasionally referred to merely as a "dispersion 2"). The volume median particle size ($D_{50}$), CV value, solid content and glass transition temperature of the polyester particles contained in the thus obtained dispersion 2 of polyester particles are shown in Table 2.

Example 3

Production of Dispersion 3 of Polyester Particles

The same procedure as in Example 1 was repeated except that the amounts of the amorphous polyester (c) and the amorphous polyester (d) were changed to 120 g and 300 g, respectively, the amount of the 20 wt % potassium hydroxide aqueous solution was changed from 67 g to 68 g, and the total amount of the deionized water to be dropped was changed to 1345 g, thereby obtaining a dispersion 3 of polyester particles (hereinafter occasionally referred to merely as a "dispersion 3"). The volume median particle size ($D_{50}$), CV value, solid content and glass transition temperature of the polyester particles contained in the thus obtained dispersion 3 of polyester particles are shown in Table 2.

Example 4

Production of Dispersion 4 of Polyester Particles

The same procedure as in Example 1 was repeated except that the amounts of the crystalline polyester (a), the amorphous polyester (c) and the amorphous polyester (d) were changed to 240 g, 210 g and 150 g, respectively, and the amount of the 20 wt % potassium hydroxide aqueous solution was changed from 67 g to 66 g, thereby obtaining a dispersion 4 of polyester particles (hereinafter occasionally referred to merely as a "dispersion 4"). The volume median particle size ($D_{50}$), CV value, solid content and glass transition temperature of the polyester particles contained in the thus obtained dispersion 4 of polyester particles are shown in Table 2.

Example 5

Production of Dispersion 5 of Polyester Particles

The same procedure as in Example 1 was repeated except that the amounts of the crystalline polyester (a), the amorphous polyester (c) and the amorphous polyester (d) were changed to 120 g, 210 g and 270 g, respectively, and the total amount of the deionized water to be dropped was changed to 1346 g, thereby obtaining a dispersion 5 of polyester particles (hereinafter occasionally referred to merely as a "dispersion 5"). The volume median particle size ($D_{50}$), CV value, solid content and glass transition temperature of the polyester particles contained in the thus obtained dispersion 5 of polyester particles are shown in Table 2.

Example 6

Production of Dispersion 6 of Polyester Particles

The same procedure as in Example 1 was repeated except that 180 g of the crystalline polyester (b) were used in place of 180 g of the crystalline polyester (a), the amount of the 20 wt % potassium hydroxide aqueous solution was changed from 67 g to 50 g, and the total amount of the deionized water to be dropped was changed to 1360 g, thereby obtaining a dispersion 6 of polyester particles (hereinafter occasionally referred to merely as a "dispersion 6"). The volume median particle size ($D_{50}$), CV value, solid content and glass transition temperature of the polyester particles contained in the thus obtained dispersion 6 of polyester particles are shown in Table 2.

Example 7

Production of Dispersion 7 of Polyester Particles

The same procedure as in Example 1 was repeated except that 180 g of the crystalline polyester (e) were used in place of 180 g of the crystalline polyester (a), thereby obtaining a dispersion 7 of polyester particles (hereinafter occasionally referred to merely as a "dispersion 7"). The volume median particle size ($D_{50}$), CV value, solid content and glass transition temperature of the polyester particles contained in the thus obtained dispersion 7 of polyester particles are shown in Table 2.

Example 8

Production of Dispersion 8 of Polyester Particles

The same procedure as in Example 1 was repeated except that the amount of the amorphous polyester (c) used was changed to 180 g and further 240 g of the amorphous polyester (f) were used in place of 210 g of the amorphous polyester (d), the amount of the 20 wt % potassium hydroxide aqueous solution was changed from 67 g to 70 g, and the total amount of the deionized water to be dropped was changed to 1344 g, thereby obtaining a dispersion 8 of polyester particles (hereinafter occasionally referred to merely as a "dispersion 8"). The volume median particle size ($D_{50}$), CV value, solid content and glass transition temperature of the polyester particles contained in the thus obtained dispersion 8 of polyester particles are shown in Table 2.

Example 9

Production of Dispersion 9 of Polyester Particles

The same procedure as in Example 1 was repeated except that the amount of the amorphous polyester (d) used was changed to 120 g and further the amorphous polyester (f) was added in an amount of 90 g, the amount of the 20 wt % potassium hydroxide aqueous solution was changed from 67 g to 68 g, and the total amount of the deionized water to be dropped was changed to 1346 g, thereby obtaining a dispersion 9 of polyester particles (hereinafter occasionally referred to merely as a "dispersion 9"). The volume median particle size ($D_{50}$), CV value, solid content and glass transition temperature of the polyester particles contained in the thus obtained dispersion 9 of polyester particles are shown in Table 2.

Example 10

Production of Dispersion 10 of Polyester Particles

The same procedure as in Example 1 was repeated except that neither the amorphous polyester (c) nor the amorphous polyester (d) was used and further the amorphous polyester (g) was used instead in an amount of 420 g, the amount of the 20 wt % potassium hydroxide aqueous solution was changed from 67 g to 71 g, and the total amount of the deionized water to be dropped was changed to 1343 g, thereby obtaining a dispersion 10 of polyester particles (hereinafter occasionally referred to merely as a "dispersion 10"). The volume median particle size ($D_{50}$), CV value, solid content and glass transition temperature of the polyester particles contained in the thus obtained dispersion 10 of polyester particles are shown in Table 2.

Example 11

Production of Dispersion 11 of Polyester Particles

Three hundred grams of the dispersion 1 of polyester particles obtained in Example 1 were maintained at a temperature of 25° C., and 3 g of "EPOCROS WS-700" (available from Nippon Shokubai Co., Ltd.; solid content: 25%) were added thereto at room temperature (25° C.), followed by heating the resulting mixture to 98° C. over 1 h. After heating, the reaction mixture was maintained at 98° C. for 1 h and then rapidly cooled to 25° C., and thereafter passed through a wire mesh having a 150 mesh screen (aperture: 105 μm), thereby obtaining a dispersion 11 of polyester particles (hereinafter occasionally referred to merely as a "dispersion 11"). The volume median particle size ($D_{50}$), CV value, solid content and glass transition temperature of the polyester particles having a crosslinked structure which were contained in the thus obtained dispersion 11 of polyester particles are shown in Table 2.

Example 12

Production of Dispersion 12 of Polyester Particles

A 5 L vessel was charged with 180 g of the crystalline polyester (a), 210 g of the amorphous polyester (c), 210 g of the amorphous polyester (d), 6 g of a nonionic surfactant ("EMULGEN (registered trademark) 150" available from Kao Corp.) and 1080 g of methyl ethyl ketone, and the contents of the vessel were stirred with a paddle-shaped stirrer at a rate of 200 rpm at 55° C.

While stirring the resulting solution with a paddle-shaped stirrer at a rate of 200 rpm, 31 g of a 30 wt % potassium hydroxide aqueous solution were added dropwise thereto at a rate of 6 g/min, and further 1429 g of deionized water were added dropwise thereto at a rate of 20 g/min. Then, the resulting reaction solution was placed under reduced pressure to remove methyl ethyl ketone therefrom, thereby obtaining a dispersion of polyester particles. Finally, the obtained dispersion was cooled to room temperature and passed through a wire mesh having a 200 mesh screen (aperture: 105 μm) to obtain a dispersion 12 of polyester particles (hereinafter occasionally referred to merely as a "dispersion 12"). The volume median particle size ($D_{50}$), CV value, solid content and glass transition temperature of the polyester particles contained in the thus obtained dispersion 12 of polyester particles are shown in Table 2.

TABLE 2

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Dispersion of polyester particles (dispersion No.) | 1 | 2 | 3 | 4 | 5 | 6 | 7 | 8 | 9 | 10 | 11 | 12 |
| Crystalline polyester | a | a | a | a | a | b | e | a | a | a | a | a |
| Amorphous polyester | c | c | c | c | c | c | c | c | c | | c | c |
| | d | d | d | d | d | d | d | | d | | d | d |
| | | | | | | | | f | f | | | |
| | | | | | | | | | | g | | |
| Crystalline polyester (a, b or e) | 30 | 30 | 30 | 40 | 20 | 30 | 30 | 30 | 30 | 30 | 30 | 30 |
| Amorphous polyester (c) | 35 | 25 | 20 | 35 | 35 | 35 | 35 | 30 | 35 | 0 | 35 | 35 |
| Amorphous polyester (d) | 35 | 45 | 50 | 25 | 45 | 35 | 35 | 0 | 20 | 0 | 35 | 35 |
| Amorphous polyester (f) | 0 | 0 | 0 | 0 | 0 | 0 | 0 | 40 | 15 | 0 | 0 | 0 |
| Amorphous polyester (g) (weight ratio) | 0 | 0 | 0 | 0 | 0 | 0 | 0 | 0 | 0 | 70 | 0 | 0 |
| Content of constitutional unit derived from trivalent or higher-valent carboxylic acid in amorphous polyester (mol %) | 6.28 | 4.49 | 3.60 | 7.32 | 5.50 | 6.28 | 6.28 | 10.50 | 8.20 | 10.53 | 6.28 | 6.28 |
| Volume median particle size of polyester particles (μm) | 0.213 | 0.248 | 0.278 | 0.282 | 0.137 | 0.151 | 0.255 | 0.363 | 0.287 | 0.375 | 0.213 | 0.24 |
| CV value of polyester particles (%) | 27 | 23 | 26 | 24 | 28 | 28 | 24 | 29 | 27 | 29 | 27 | 23 |
| Solid content (wt %) | 30 | 31 | 30 | 30 | 32 | 32 | 32 | 29 | 31 | 29 | 30 | 33 |
| Glass transition temperature of polyester particles (° C.) | 38 | 39 | 39 | 35 | 47 | 38 | 33 | 33 | 36 | 37 | 38 | 45 |

Comparative Example 1

Production of Dispersion 13 of Polyester Particles

The same procedure as in Example 1 was repeated except that no amorphous polyester (c) was used and further the amount of the amorphous polyester (d) used was changed to 420 g, and the total amount of the deionized water to be dropped was changed to 1344 g, thereby obtaining a dispersion 13 of polyester particles (hereinafter occasionally referred to merely as a "dispersion 13"). The volume median particle size ($D_{50}$), CV value, solid content and glass transition temperature of the polyester particles contained in the thus obtained dispersion 13 of polyester particles are shown in Table 3.

Comparative Example 2

Production of Dispersion 14 of Polyester Particles

The same procedure as in Example 1 was repeated except that the amounts of the amorphous polyester (c) and the amorphous polyester (d) used were changed to 60 g and 360 g, respectively, the amount of the 20 wt % potassium hydroxide aqueous solution was changed from 67 g to 69 g, and the total amount of the deionized water to be dropped was changed to 1345 g, thereby obtaining a dispersion 14 of polyester particles (hereinafter occasionally referred to merely as a "dispersion 14"). The volume median particle size ($D_{50}$), CV value, solid content and glass transition temperature of the polyester particles contained in the thus obtained dispersion 14 of polyester particles are shown in Table 3.

Comparative Example 3

Production of Dispersion 15 of Polyester Particles

The same procedure as in Example 1 was repeated except that 180 g of the crystalline polyester (b) were used in place of 180 g of the crystalline polyester (a) and further the amounts of the amorphous polyester (c) and the amorphous polyester (d) used were changed to 60 g and 360 g, respectively, the amount of the 20 wt % potassium hydroxide aqueous solution was changed from 67 g to 53 g, and the total amount of the deionized water to be dropped was changed to 1358 g, thereby obtaining a dispersion 15 of polyester particles (hereinafter occasionally referred to merely as a "dispersion 15"). The volume median particle size ($D_{50}$), CV value, solid content and glass transition temperature of the polyester particles contained in the thus obtained dispersion 15 of polyester particles are shown in Table 3.

Comparative Example 4

Production of Dispersion 16 of Polyester Particles

The same procedure as in Example 1 was repeated except that no crystalline polyester (a) was used and further the amounts of the amorphous polyester (c) and the amorphous polyester (d) used were changed to 210 g and 420 g, respectively, the amount of the 20 wt % potassium hydroxide aqueous solution was changed from 67 g to 69 g, and the total amount of the deionized water to be dropped was changed to 1344 g, thereby obtaining a dispersion 16 of polyester particles (hereinafter occasionally referred to merely as a "dispersion 16"). The volume median particle size ($D_{50}$), CV value, solid content and glass transition temperature of the polyester particles contained in the thus obtained dispersion 16 of polyester particles are shown in Table 3.

Comparative Example 5

Production of Dispersion 17 of Polyester Particles

The same procedure as in Example 1 was repeated except that no crystalline polyester (d) was used and further the amount of the amorphous polyester (c) used was changed to 420 g, the amount of the 20 wt % potassium hydroxide aqueous solution was changed from 67 g to 63 g, and the total amount of the deionized water to be dropped was changed to 1350 g, thereby obtaining a dispersion 17 of polyester particles (hereinafter occasionally referred to merely as a "dispersion 17"). The volume median particle size ($D_{50}$), CV value, solid content and glass transition temperature of the polyester particles contained in the thus obtained dispersion 17 of polyester particles are shown in Table 3.

Comparative Example 6

Production of Dispersion 18 of Polyester Particles

The same procedure as in Example 12 was repeated except that the amounts of the amorphous polyester (c) and the amorphous polyester (d) used were changed to 60 g and 360 g, respectively, the amount of the 30 wt % potassium hydroxide aqueous solution was changed from 31 g to 32 g, and the total amount of the deionized water to be dropped was changed from 1429 g to 1430 g, thereby obtaining a dispersion 18 of polyester particles (hereinafter occasionally referred to merely as a "dispersion 18"). The volume median particle size ($D_{50}$), CV value, solid content and glass transition temperature of the polyester particles contained in the thus obtained dispersion 18 of polyester particles are shown in Table 3.

Comparative Example 7

Production of Dispersion 19 of Polyester Particles

The same procedure as in Example 12 was repeated except that no crystalline polyester (c) was used and further the amount of the amorphous polyester (d) used was changed to 420 g, the amount of the 30 wt % potassium hydroxide aqueous solution was changed from 31 g to 32 g, and the total amount of the deionized water to be dropped was changed from 1429 g to 1430 g, thereby obtaining a dispersion 19 of polyester particles (hereinafter occasionally referred to merely as a "dispersion 19"). The volume median particle size ($D_{50}$), CV value, solid content and glass transition temperature of the polyester particles contained in the thus obtained dispersion 19 of polyester particles are shown in Table 3.

Reference Example 1

Production of Dispersion 20 of Polyester Particles

A 5 L vessel was charged with 210 g of the amorphous polyester (c), 420 g of the amorphous polyester (d), 6 g of a nonionic surfactant ("EMULGEN (registered trademark) 430" available from Kao Corp.), 40 g of an anionic surfactant ("NEOPELEX (registered trademark) G-15" available from Kao Corp.; 15 wt % aqueous solution of sodium dodecylbenzenesulfonate) and 268 g of a 5 wt % potassium hydroxide aqueous solution, and the contents of the vessel were melted at 98° C. for 2 h while stirring with a paddle-shaped stirrer at a rate of 200 rpm, thereby obtaining a resin binder mixture.

Next, while stirring with a paddle-shaped stirrer at a rate of 200 rpm, 1145 g in total of deionized water were added dropwise into the vessel at a rate of 6 g/min to prepare a dispersion of polyester particles. Finally, the obtained dispersion was cooled to room temperature and passed through a wire mesh having a 200 mesh screen (aperture; 105 μm) to obtain a dispersion 20 of polyester particles (hereinafter occasionally referred to merely as a "dispersion 20"). The volume median particle size ($D_{50}$), CV value, solid content and glass transition temperature of the polyester particles contained in the thus obtained dispersion 20 of polyester particles are shown in Table 3.

TABLE 3

|  | Comparative Examples | | | | | | | Reference |
|---|---|---|---|---|---|---|---|---|
|  | 1 | 2 | 3 | 4 | 5 | 6 | 7 | Example 1 |
| Dispersion of polyester particles (dispersion No.) | 13 | 14 | 15 | 16 | 17 | 18 | 19 | 20 |
| Crystalline polyester | a | a | b | / | a | a | a | / |
| Amorphous polyester | d | c d | c d | c d | c | c d | d | c d |
| Crystalline polyester (a, b or e) | 30 | 30 | 30 | 0 | 30 | 30 | 30 | 0 |
| Amorphous polyester (c) | 0 | 10 | 10 | 35 | 70 | 10 | 0 | 35 |
| Amorphous polyester (d) | 70 | 60 | 60 | 65 | 0 | 60 | 70 | 65 |
| Amorphous polyester (f) | 0 | 0 | 0 | 0 | 0 | 0 | 0 | 0 |
| Amorphous polyester (g) (weight ratio) | 0 | 0 | 0 | 0 | 0 | 0 | 0 | 0 |
| Content of constitutional unit derived from trivalent or higher-valent carboxylic acid in amorphous polyester (mol %) | 0 | 1.80 | 1.80 | 4.41 | 12.5 | 1.80 | 0 | 4.41 |
| Volume median particle size of polyester particles (μm) | 0.202 | 0.326 | 0.265 | 0.185 | —[*3] | 0.216 | 0.195 | 0.153 |
| CV value of polyester particles (%) | 29 | 25 | 24 | 23 | —[*3] | 23 | 24 | 25 |
| Solid content (wt %) | 30 | 30 | 31 | 31 | —[*3] | 34 | 33 | 31 |
| Glass transition temperature of polyester particles (° C.) | 39 | 38 | 39 | 60 | —[*3] | 45 | 44 | 60 |

Note
[*3]Not emulsifiable and therefore unmeasurable.

Production Example 8

Production of Releasing Agent Dispersion 1

After dissolving 10.71 g of an aqueous solution of dipotassium alkenyl (mixture of hexadecenyl group and octadecenyl group) succinate ("LATEMUL (registered trademark) ASK" available from Kao Corp.; effective concentration: 28% by weight) in 1200 g of deionized water in a 1 L beaker, 300 g of a carnauba wax (available from S. Kato & Co.; melting point: 85° C.) were dispersed in the resulting solution. While maintaining the obtained dispersion at a temperature of 90 to 95° C., the dispersion was subjected to dispersing treatment for 60 min using "Ultrasonic Homogenizer 600W" (available from Nippon Seiki Co., Ltd.) and then cooled to room temperature. The releasing agent emulsified particles contained in the thus obtained releasing agent dispersion had a volume median particle size ($D_{50}$) of 0.512 μm and a CV value of 42.2%. The thus obtained dispersion was mixed with ion-exchanged water to control a wax content therein to 20% by weight, thereby obtaining a releasing agent dispersion 1.

Production Example 9

Production of Colorant Dispersion 1

A 2 L beaker was charged with 467 g of deionized water, 250 g of copper phthalocyanine ("ECB-301" available from Dainichiseika Color & Chemicals Mfg. Co., Ltd.) and 333 g of an anionic surfactant ("NEOPELEX (registered trademark) G-15" available from Kao Corp.; 15 wt % aqueous solution of sodium dodecylbenzenesulfonate), and the contents of the beaker were dispersed for 10 min using "Ultrasonic Homogenizer 600W" (available from Nippon Seiki Co., Ltd.) and further dispersed for 10 min using "Ultrahigh Pressure Homogenizer M-140K" (available from Mizuho Kogyo Co., Ltd.), thereby obtaining a colorant dispersion 1. The colorant particles contained in the thus obtained colorant dispersion 1 had a volume median particle size ($D_{50}$) of 0.120 μm and a CV value of 28.1%.

Example 13

A 2 L vessel (four-necked flask) equipped with a dehydration tube, a stirrer and a thermocouple was charged with 300 g of the dispersion 1 of polyester particles, 66 g of deionized water, 3 g of "EPOCROS (registered trademark) WS-700" (available from Nippon Shokubai Co., Ltd.; number-average molecular weight: 20,000; weight-average molecular weight: 40,000; 25% aqueous solution) as a crosslinking agent and 24 g of the releasing agent dispersion 1, and the contents of the flask were mixed with each other at room temperature (25° C.). Then, while stirring the resulting mixture with a paddle-shaped stirrer, an aqueous solution prepared by dissolving 25 g of ammonium sulfate in 362 g of deionized water was added dropwise to the mixture at room temperature over 10 min.

Next, the resulting mixed dispersion was heated to 55° C. (at a temperature rise rate of 0.25° C./min) and held at 55° C. for 2 h, and then a mixed solution containing 144 g of the dispersion 20 of polyester particles and 39 g of deionized water was added thereto at a rate of 0.6 g/min. Thereafter, 500 g of a 1.4 wt % aqueous solution of an anionic surfactant ("EMAL (registered trademark) E27C" available from Kao Corp.) were added to the dispersion, and the resulting mixture was heated to 80° C. and then held at 80° C. for 1 h, thereby obtaining coalesced particles. The thus obtained coalesced particles were cooled and then subjected to a suction filtration step, a washing step and a drying step, thereby obtaining a toner A. The volume median particle size and CV value of the thus obtained toner A as well as the evaluation result for a fusing property thereof are shown in Table 4.

Examples 14 TO 22 and Comparative Examples 8 to 13

The same procedure as in Example 13 was repeated except that the dispersion 1 of polyester particles was replaced with those shown in Table 4 or 5, thereby obtaining toners B to J and toners M to R. The volume median particle sizes and CV values of the thus obtained toners B to J as well as the evaluation results for a fusing property thereof are shown in Table 4, and the volume median particle sizes and CV values of the thus obtained toners M to R as well as the evaluation results for a fusing property thereof are shown in Table 5.

Example 23

The same procedure as in Example 13 was repeated except that the dispersion 11 of polyester particles was used in place of the dispersion 1 of polyester particles, and no "EPOCROS (registered trademark) WS-700" as a crosslinking agent was used, thereby obtaining a toner K. The volume median particle size and CV value of the thus obtained toner K as well as the evaluation result for a fusing property thereof are shown in Table 4.

Example 24

A 2 L vessel (four-necked flask) equipped with a dehydration tube, a stirrer and a thermocouple was charged with 300 g of the dispersion 13 of polyester particles, 66 g of deionized water, 15 g of the colorant dispersion 1 and 24 g of the releasing agent dispersion 1, and the contents of the flask were mixed with each other at room temperature (25° C.).

Next, while stirring the resulting mixture with a paddle-shaped stirrer, an aqueous solution prepared by dissolving 25 g of ammonium sulfate in 362 g of deionized water was added dropwise to the mixture at room temperature over 10 min. The thus obtained mixed dispersion was heated to 55° C. (at a temperature rise rate of 0.25° C./min) and held at 55° C. for 2 h, and then a mixed solution containing 144 g of the dispersion 20 of polyester particles and 39 g of deionized water was added thereto at a rate of 0.6 g/min. Thereafter, 500 g of a 1.4 wt % aqueous solution of an anionic surfactant ("EMAL (registered trademark) E27C" available from Kao Corp.) were added to the dispersion, and the resulting mixture was heated to 80° C. and then held at 80° C. for 1 h, thereby obtaining coalesced particles.

The thus obtained coalesced particles were cooled and then subjected to a suction filtration step, a washing step and a drying step, thereby obtaining a toner L. The volume median particle size and CV value of the thus obtained toner L as well as the evaluation result for a fusing property thereof are shown in Table 4.

TABLE 5

| | Comparative Examples | | | | | |
|---|---|---|---|---|---|---|
| | 8 | 9 | 10 | 11 | 12 | 13 |
| | Toners | | | | | |
| | Toner M | Toner N | Toner O | Toner P | Toner Q | Toner R |
| Dispersion of polyester particles used for core particles (dispersion No.) | 13 | 14 | 15 | 16 | 18 | 19 |
| Dispersion of polyester particles used for shell particles (dispersion No.) | 20 | 20 | 20 | 20 | 20 | 20 |
| Properties | | | | | | |
| Volume median particle size of toner (μm) | 5.2 | 5.1 | 4.9 | 5.0 | 5.3 | 5.2 |
| CV value of toner (%) | 23 | 24 | 26 | 24 | 26 | 26 |
| Evaluation results | | | | | | |
| Lowest fusing temperature (° C.) | 130 | 130 | 125 | 140 | 135 | 135 |
| Hot offset generating temperature (° C.) | 150 | 155 | 150 | 185 | 155 | 145 |
| Fusing temperature range (° C.) | 20 | 25 | 25 | 45 | 20 | 10 |

INDUSTRIAL APPLICABILITY

The toner produced from the dispersion of polyester particles according to the present invention is excellent in low-temperature fusing property and anti-hot offset property and therefore can be suitably used as a toner for electrophotography.

The invention claimed is:

1. A process for producing a toner for electrophotography, comprising:
emulsifying a mixed polyester comprising (1) an amorphous polyester containing a constitutional unit derived from a trivalent or higher-valent carboxylic acid in an amount of from 6.28 to 12.0 mol % on the basis of whole constitutional units of the whole amorphous polyester and (2) a crystalline polyester, in an aqueous medium in

TABLE 4

| | Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| | Toners | | | | | | | | | | | |
| | Toner A | Toner B | Toner C | Toner D | Toner E | Toner F | Toner G | Toner H | Toner I | Toner J | Toner K | Toner L |
| Dispersion of polyester particles used for core particles (dispersion No.) | 1 | 2 | 3 | 4 | 5 | 6 | 7 | 8 | 9 | 10 | 11 | 12 |
| Dispersion of polyester particles used for shell particles (dispersion No.) | 20 | 20 | 20 | 20 | 20 | 20 | 20 | 20 | 20 | 20 | 20 | 20 |
| Properties | | | | | | | | | | | | |
| Volume median particle size of toner (μm) | 4.9 | 5.0 | 5.2 | 4.9 | 5.0 | 5.1 | 5.1 | 5.0 | 4.8 | 5.1 | 5.1 | 5.4 |
| CV value of toner (%) | 25 | 24 | 23 | 24 | 25 | 25 | 23 | 26 | 24 | 26 | 24 | 27 |
| Evaluation results | | | | | | | | | | | | |
| Lowest fusing temperature (° C.) | 130 | 125 | 130 | 130 | 135 | 125 | 135 | 130 | 130 | 135 | 130 | 135 |
| Hot offset generating temperature (° C.) | ≥200 | 180 | 175 | ≥200 | 190 | 190 | 195 | 190 | 190 | ≥200 | ≥200 | 190 |
| Fusing temperature range (° C.) | ≥70 | 55 | 45 | ≥70 | 55 | 65 | 60 | 60 | 60 | ≥70 | ≥70 | 55 | a single vessel, and at a temperature of not lower than the softening point of the crystalline polyester and not higher than the softening point of the amorphous polyester, wherein the crystalline polyester contains a constitutional unit derived from an aromatic carboxylic acid component in an amount of from 50 to 100 mol % on the basis of a whole carboxylic acid component constituting the crystalline polyester, and the following:

aggregating at least the polyester particles present in said dispersion of the polyester particles obtained from said emulsifying to obtain a dispersion of aggregated particles, and coalescing the aggregated particles present in the dispersion of the aggregated particles obtained from said aggregation.

2. The process for producing a toner for electrophotography according to claim 1, wherein a temperature of the dispersion of the polyester particles during said aggregation is not lower than a glass transition temperature of the polyester particles present in the dispersion of the polyester particles.

3. The process for producing a toner for electrophotography according to claim 1, wherein said aggregating further comprises adding a dispersion of other resin fine particles to the dispersion of the aggregated particles.

4. The process for producing a toner for electrophotography according to claim 3, wherein a temperature of a mixed dispersion comprising the aggregated particles and the other resin fine particles and obtained from said adding is not higher than a glass transition temperature of the other resin fine particles.

5. The process for producing a toner for electrophotography according to claim 1, wherein said emulsifying further comprises emulsifying the mixed polyester in the presence of a nonionic surfactant.

6. The process for producing a toner for electrophotography according to claim 1, wherein the constitutional unit derived from the trivalent or higher-valent carboxylic acid is in an amount of from 6.28 to 10.6 mol % on the basis of whole constitutional units of the whole amorphous polyester.

7. The process for producing a toner for electrophotography according to claim 1, wherein said emulsifying further comprises emulsifying the mixed polyester in the presence of both a nonionic surfactant and an anionic surfactant.

8. The process for producing a toner for electrophotography according to claim 1, wherein a content of water in said aqueous medium is substantially 100% by weight.

9. The process for producing a toner for electrophotography according to claim 1, wherein a weight ratio of the crystalline polyester to the amorphous polyester (crystalline polyester/amorphous polyester) in the mixed polyester is from 1/9 to 4/6.

10. The process for producing a toner for electrophotography according to claim 1, wherein the crystalline polyester contains a constitutional unit derived from an aromatic carboxylic acid component in an amount of from 80 to 100 mol % on the basis of a whole carboxylic acid component constituting the crystalline polyester.

11. The process for producing a toner for electrophotography according to claim 1, wherein the softening point of the crystalline polyester is 70 to 130° C.

12. The process for producing a toner for electrophotography according to claim 1, wherein the softening point of the crystalline polyester is 80 to 110° C.

13. The process for producing a toner for electrophotography according to claim 1, wherein the softening point of the amorphous polyester is 70 to 165° C.

14. The process for producing a toner for electrophotography according to claim 1, wherein the amorphous polyester comprises two amorphous polyesters (i) and (ii) having softening points differing from each other.

15. The process for producing a toner for electrophotography according to claim 14, wherein the amorphous polyester (i) has a softening point not lower than 70° C. and lower than 150° C., and the amorphous polyester (ii) has a softening point of from 115 to 165° C.

16. The process for producing a toner for electrophotography according to claim 15, wherein the amorphous polyester (i) and the amorphous polyester (ii) are present in a weight ratio (i)/(ii) of from 5/5 to 9/1.

17. The process for producing a toner for electrophotography according to claim 1, wherein emulsifying the mixed polyester is carried out in the presence of an aqueous alkali solution.

18. The process for producing a toner for electrophotography according to claim 1, wherein the aqueous medium is added to emulsify the mixed polyester at a velocity of from 0.1 to 50 parts by weight/min based on 100 parts by weight of the mixed polyester.

19. The process for producing a toner for electrophotography according to claim 1, wherein the amount of the aqueous medium is from 100 to 2,000 parts by weight based on 100 parts by weight of the mixed polyester.

* * * * *